US011267733B2

(12) United States Patent
Luke et al.

(10) Patent No.: US 11,267,733 B2
(45) Date of Patent: Mar. 8, 2022

(54) REMOVAL OF PHOSPHORUS FROM WATER

(71) Applicant: Phosphorus Free Water Solutions, LLC, Lakeland, FL (US)

(72) Inventors: Donald A. Luke, Valrico, FL (US); Ruben D. Durand-Diaz, Brandon, FL (US); Brent Canham, Lakeland, FL (US); David Velazquez Torres, Lakeland, FL (US); Timothy M. Luke, Valrico, FL (US)

(73) Assignee: Phosphorus Free Water Solutions, LLC, Lakeland, FL (US)

( * ) Notice: Subject to any disclaimer, the term of this patent is extended or adjusted under 35 U.S.C. 154(b) by 23 days.

(21) Appl. No.: 16/650,945

(22) PCT Filed: Oct. 1, 2018

(86) PCT No.: PCT/US2018/053742
§ 371 (c)(1),
(2) Date: Mar. 26, 2020

(87) PCT Pub. No.: WO2019/070574
PCT Pub. Date: Apr. 11, 2019

(65) Prior Publication Data
US 2020/0247699 A1 Aug. 6, 2020

Related U.S. Application Data

(60) Provisional application No. 62/566,865, filed on Oct. 2, 2017.

(51) Int. Cl.
*C02F 1/76* (2006.01)
*C01G 49/02* (2006.01)
*C02F 1/28* (2006.01)
*C02F 1/66* (2006.01)
*C02F 101/10* (2006.01)

(52) U.S. Cl.
CPC ............... *C02F 1/76* (2013.01); *C01G 49/02* (2013.01); *C02F 1/281* (2013.01); *C02F 1/66* (2013.01); *C02F 2101/105* (2013.01)

(58) Field of Classification Search
USPC ....................................................... 210/668
See application file for complete search history.

(56) References Cited

U.S. PATENT DOCUMENTS

| 4,017,388 | A | * | 4/1977 | Albertson | C02F 1/5236 210/713 |
| 4,689,154 | A | * | 8/1987 | Zimberg | C02F 1/283 210/667 |
| 5,759,401 | A | * | 6/1998 | Boussely | C02F 3/1215 210/605 |
| 5,833,856 | A | * | 11/1998 | Liu | C02F 3/308 210/605 |
| 5,876,606 | A | * | 3/1999 | Blowes | E03F 1/002 210/679 |
| 6,387,254 | B1 | * | 5/2002 | Takechi | C02F 3/308 210/195.1 |
| 6,623,642 | B2 | * | 9/2003 | Robertson | C02F 1/5236 210/151 |
| 6,770,205 | B1 | * | 8/2004 | Schroder | B09C 1/002 134/7 |
| 7,399,416 | B2 | * | 7/2008 | Moller | B01D 21/01 210/673 |
| 7,563,373 | B2 | * | 7/2009 | Bolduc | C02F 1/5245 210/619 |
| 7,662,206 | B2 | | 2/2010 | Burnham | |
| 7,947,104 | B2 | | 5/2011 | Burnham et al. | |
| 8,202,342 | B2 | | 6/2012 | Burnham | |
| 8,449,756 | B2 | | 5/2013 | Monzyk et al. | |
| 8,721,885 | B2 | * | 5/2014 | Drizo | C02F 1/281 210/259 |
| 8,754,004 | B2 | * | 6/2014 | Penn | C02F 1/281 502/439 |
| 9,822,024 | B2 | * | 11/2017 | Meng | C02F 1/5254 |
| 2003/0146169 | A1 | | 8/2003 | Ciampi et al. | |
| 2003/0217968 | A1 | * | 11/2003 | Goel | C02F 3/1221 210/605 |
| 2004/0253171 | A1 | | 12/2004 | Cojan et al. | |
| 2005/0053543 | A1 | | 3/2005 | Kneip et al. | |

(Continued)

FOREIGN PATENT DOCUMENTS

| CN | 102167460 B | 7/2012 |
| CN | 103626276 A | 3/2014 |
| CN | 105417672 A | 3/2016 |
| CN | 105692964 A | 6/2016 |

(Continued)

OTHER PUBLICATIONS

English Translation CN 105692964, "New Technology for removing phosphrus in livestock and poultry breeding wastewater.", Weixuan et al., Published Jun. 22, 2016 (Year: 2016).*
"International Application Serial No. PCT US2018 053745, International Preliminary Report on Patentability dated Apr. 16, 2020", 8 pgs.
"International Application Serial No. PCT US2018 053742, International Preliminary Report on Patentability dated Apr. 16, 2020", 9 pgs.
"International Application Serial No. PCT/US2018/053742, International Search Report dated Dec. 3, 2018", 2 pgs.
"International Application Serial No. PCT/US2018/053742, Written Opinion dated Dec. 3, 2018", 7 pgs.
"International Application Serial No. PCT/US2018/053745, International Search Report dated Nov. 30, 2018", 2 pgs.

(Continued)

*Primary Examiner* — Nina Bhat
(74) *Attorney, Agent, or Firm* — Schwegman Lundberg & Woessner, P.A.

(57) ABSTRACT

A method of removing phosphorus from water includes contacting an oxidizer with water including phosphorus to form water including oxidized phosphorus. The method also includes contacting the water including the oxidized phosphorus with a reactive media to capture the oxidized phosphorus on the reactive media, in the reactive media, or a combination thereof, as a solid salt comprising the oxidized phosphorus.

17 Claims, No Drawings

(56) References Cited

U.S. PATENT DOCUMENTS

| | | |
|---|---|---|
| 2005/0271575 A1 | 12/2005 | Ciampi et al. |
| 2009/0216060 A1 | 8/2009 | Monzyk et al. |
| 2012/0211426 A1 | 8/2012 | Santoro et al. |
| 2013/0092532 A1 | 4/2013 | Monzyk et al. |
| 2013/0098840 A1* | 4/2013 | Helferich ............ B01J 20/3204 210/670 |
| 2013/0175224 A1 | 7/2013 | Ciampi et al. |
| 2016/0031732 A1 | 2/2016 | Ciampi et al. |
| 2016/0326011 A1 | 11/2016 | Ma et al. |
| 2020/0270145 A1 | 8/2020 | Luke et al. |

FOREIGN PATENT DOCUMENTS

| | | |
|---|---|---|
| CN | 105967293 A | 9/2016 |
| CN | 106335960 A | 1/2017 |
| CN | 104828924 B | 5/2017 |
| CN | 106669633 A | 5/2017 |
| CN | 108128925 A | 6/2018 |
| WO | WO-03050043 A2 | 6/2003 |
| WO | WO-2014200771 A1 | 12/2014 |
| WO | WO-2016145487 A1 | 9/2016 |
| WO | WO-2019070574 A1 | 4/2019 |
| WO | WO-2019070576 A1 | 4/2019 |

OTHER PUBLICATIONS

"International Application Serial No. PCT/US2018/053745, Written Opinion dated Nov. 30, 2018", 6 pgs.

Melia, et al., "Trends in the recovery of phosphorus in bioavailable forms from wastewater", Kingston University London Research Repository,, [Online] Retrieved from the internet: <https://eprints.kingston.ac.uk/38767>, (Aug. 9, 2017), 1-48.

Menar, A., et al., "Calcium Phosphate Precipitation in Wastewater Treatment", Sanitary Engineering research Laboratory, University of California, Berkeley, California, SERL Report No. 72-6, (Jun. 1972), 99 pgs.

* cited by examiner

REMOVAL OF PHOSPHORUS FROM WATER

CROSS-REFERENCE TO RELATED APPLICATION

This application is a U.S. National Stage Filing under 35 U.S.C. 371 from International Patent Application Serial No. PCT/US2018/053742, filed Oct. 1, 2018, published on Apr. 11, 2019 as WO2019/070574 A1, which application claims the benefit of priority to U.S. Provisional Patent Application Ser. No. 62/566,865 filed Oct. 2, 2017, the disclosures of which are incorporated herein in their entireties by reference.

BACKGROUND

Phosphorus is a common constituent of agricultural fertilizers, manure, and organic wastes in sewage and industrial effluent. It is an essential element for plant life, but when there is too much of it in water, it can cause growth of plants and algae and deplete oxygen from the water at a rate that is greater than ecosystems can handle and can have severe ecological effects including toxic algae blooms, death of native aquatic species, and loss of biodiversity (eutrophication). Although various methods for removal of phosphorus from water are available, existing methods can be expensive, inconvenient, inefficient, lack scalability, or can be environmentally unfriendly.

SUMMARY OF THE INVENTION

In various embodiments, the present invention provides a method of removing phosphorus from water. The method includes contacting an oxidizer with water including phosphorus to form water including oxidized phosphorus. The method also includes contacting the water including the oxidized phosphorus with a reactive media to capture the oxidized phosphorus on the reactive media, in the reactive media, or a combination thereof, as a solid salt comprising the oxidized phosphorus.

In various embodiments, the present invention provides a method of removing oxidized phosphorus from water. The method includes contacting water including ferrate-oxidized phosphorus with a calcium-containing reactive media to capture the oxidized phosphorus on the reactive media, in the reactive media, or a combination thereof, as a salt of calcium and phosphate.

In various embodiments, the present invention provides a method of removing phosphorus from water. The method includes contacting ferrate and water including phosphorus to form water including phosphate. The method also includes contacting the water including the phosphate at a pH of about 10 to about 12 with a calcium-containing reactive media to capture the oxidized phosphorus on the reactive media, in the reactive media, or a combination thereof, as a salt of calcium and phosphate.

In various embodiments, the present invention provides an apparatus for removing phosphorus from water. The apparatus includes a reactor for contacting an oxidizer with water including phosphorus to form water including oxidized phosphorus. The apparatus includes a contactor for contacting the water including the oxidized phosphorus with a reactive media to capture the oxidized phosphorus on the reactive media, in the reactive media, or a combination thereof, as a solid salt comprising the oxidized phosphorus.

Various embodiments of the present invention provide certain advantages over other methods of removing phosphorus from water, at least some of which are unexpected. For example, in various embodiments, the present method of removing phosphorus from water can be more convenient and efficient than other methods. In various embodiments, the present method can use less energy or require less capital expenditure than other methods. In various embodiments, the present method can be more easily and effectively scalable than other methods. In various embodiments, the present method can be more environmentally friendly than other methods, such as by providing filtered water having fewer contaminants added by the phosphorus-removal process, and such as by being free of waste products with high environmental impact.

In some embodiments, the oxidation can cause a raising of the pH of the water, for example, the oxidizer can include base or be contained in a basic solution. At high pH, the solid calcium salt formed in or on the reactive media from the oxidized phosphorus can be less soluble in water (e.g., hydroxyapatite or tricalcium phosphate) as compared to solid calcium salts formed in the reactive media at lower pH (e.g., monocalcium phosphate or dicalcium phosphate). Therefore, in various embodiments, the reactive media can have enhanced effectiveness for removal of phosphorus to extremely low levels when used in combination with the oxidative step, in comparison to using the reactive media as a sorbent for a lower pH material.

In various embodiments, the reactive media can capture a larger amount of phosphorus per atom of calcium in the reactive media than other reactive media. The reactive media can capture all or a portion of the phosphorus in the form of tricalcium phosphate, having a calcium to phosphorus ratio of 1.5:1, instead of other types of calcium phosphates with higher calcium to phosphorus ratios, such as hydroxyapatite, having a calcium to phosphorus ratio of greater than 1.5:1 such as 1.7:1. By avoiding production of hydroxyapatite, a material that can rapidly clog flow pathways and that can be difficult to separate, various embodiments maintain permeability of the reactive media for longer time and provide for removal of a given amount of phosphorus using a smaller amount of the reactive media.

In various embodiments, the reactive media can provide a larger amount of reactive calcium per mass of the reactive media as compared to other media, such as compared to any similar media, or such as compared to similar media of similar or lesser cost. Some reactive media must be prepared in specialized high-temperature kilns that require extra expense. However, in some embodiments, the reactive media used in the present method can be formed from a composition having a mole % Si in Ca that is closer to a eutectic composition between these two materials (e.g., having a local or global minimum melting point on an Si—Ca binary phase diagram or another phase diagram corresponding to the reactive media starting material) than other reactive media that provide reactive calcium, allowing the use of a lower vitrification temperature that is more conveniently achieved in low-cost conventional kilns, thereby providing an overall decreased expense. In various embodiments, the reactive media of the present invention can be less dense and have greater porosity than other media, which can allow water to penetrate the media more efficiently and to contact a greater proportion of the reactive calcium than other reactive media, such that a smaller amount of media removes the same amount of oxidized phosphorus as compared to other media. In various embodiments, the lower density and higher porosity of the media allows for higher flow rates and more efficient removal of the oxidized phosphorus.

In various embodiments, the method of the present invention can include using and optionally generating ferrate in a form (e.g., in an acidic environment) that is more stable and that degrades more slowly than other forms of ferrate. In various embodiments, the method of the present invention can include using a ferrate oxidizer under acidic or neutral conditions, which can allow the ferrate to perform as an oxidizer with greater efficiency than other methods for oxidizing using ferrate. In various embodiments, the method of the present invention can include forming ferrate under acidic conditions, providing a simpler and more convenient ferrate synthesis, a higher yield of the ferrate, a higher concentration of the ferrate, or higher oxidative activity of the ferrate, as compared to other ferrate synthesis procedures such as basic ferrate synthesis procedures. In various embodiments, the ferrate of the present invention is stable in an acidic environment.

In various embodiments, the method of the present invention can include using and optionally generating ferrate in a form that is more concentrated than other forms of ferrate, allowing for more facile storage and transport of the ferrate, and more efficient use of space. In various embodiments, the higher concentration of ferrate produced allows the addition of a smaller amount of the concentrated ferrate to the phosphorus-containing water, allowing the pH of the phosphorus-containing water being treated to remain nearly the same before and after treatment, contrasting with other forms of ferrate in less concentrated forms requiring an addition of a larger amount of ferrate-containing solution and that correspondingly affect the pH of the phosphorus-containing water being treated to a higher degree, and that increase the concentration of other materials in the phosphorus-containing water that are present in the ferrate solution.

In various embodiments, the method of the present invention can include using ferrate at a lower concentration than other methods to oxidize the same amount of phosphorus. Ferrate can have higher oxidative activity (e.g., a higher oxidation potential) at a given concentration at a lower pH as compared to at a higher pH; therefore, in various embodiments, the ability to maintain the pH of the phosphorus-water being treated at neutral or slightly acidic levels during oxidation with the ferrate can allow a given amount of ferrate to oxidize a larger amount of phosphorus, to oxidize at a higher rate, or a combination thereof, as compared to other methods that include using the ferrate at higher pH. In various embodiments, the use of the ferrate for oxidation under neutral or acidic pH can cause less formation of iron hydroxide than oxidizing with ferrate under basic conditions, clogging the reactive media less and allowing more efficient removal of phosphorus. The use of lower concentrations of ferrate can reduce the concentration of iron in the ferrate-treated water.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

Method of Removing Phosphorus from Water.

Various embodiments of the present invention provide a method of removing phosphorus from water. The method can include contacting water including phosphorus with an oxidizer to form an oxidized phosphorus. The method also includes contacting the water including the oxidized phosphorus with a reactive media to capture the oxidized phosphorus on or within the reactive media as a solid salt including the oxidized phosphorus.

The phosphorus in the water at the onset of the present method can be any one or more suitable forms of phosphorus. The phosphorus in the water can be in the form of elemental phosphorus, inorganic phosphorus, organic phosphorus, a dissolved form of phosphorus, a solid form of phosphorus, or a combination thereof. The phosphorus in the water can be oxidized or non-oxidized. The phosphorus in the water can have a concentration of about 0.001 ppm to about 10,000 ppm (wherein all ppm herein are ppm by weight unless otherwise indicated), about 0.01 ppm to about 1,000 ppm, about 0.01 to 20 ppm, about 0.05 ppm to about 10 ppm, about 0.05 ppm to about 1 ppm, about 1 ppm to about 10 ppm, or about 0.001 ppm or less, or less than, equal to, or greater than about 0.005 ppm, 0.01, 0.05, 0.1, 0.2, 0.4, 0.6, 0.8, 1, 1.2, 1.4, 1.6, 1.8, 2, 2.5, 3, 3.5, 4, 4.5, 5, 6, 7, 8, 9, 10, 20, 30, 40, 50, 75, 100, 150, 200, 250, 500, 1,000, 2,500, 5,000 ppm, or about 10,000 ppm or more.

After contacting with the reactive media, the water can have a phosphorus concentration of about 0 ppm to about 1 ppm, about 0.0001 ppm to about 1 ppm, 0.0001 ppm to about 0.1 ppm, about 0.001 ppm to about 0.1 ppm, or about 0 ppm to about 0.05 ppm, or about 0 ppm to about 0.005 ppm, or about 0.0001 ppm or less, or less than, equal to, or greater 0.0005 ppm, 0.001, 0.005, 0.01, 0.05, 0.1, 0.5 ppm, or about 1 ppm or more. After contacting with the reactive media, the water can have a phosphorus concentration of less than 0.05 ppm, or less than 0.005 ppm.

The method can include a pre-oxidation filtration process that includes filtering the water including the phosphorus prior to contacting the water including the phosphorus with the oxidizer. The pre-oxidation filtration can remove particulates, such as organic or inorganic particles. The pre-oxidation filtration can help to reduce or minimize the amount of oxidizer that is consumed by oxidizing particulate materials such as organics. The filtration can be performed using any suitable filter, such as using a bag filter, sand filtration, or filter cartridges. One or more filters can be used, such as filters having successively smaller pore sizes. The filter can have any suitable pore size, or can remove particles larger than any suitable size, such as about 1 micron to about 1,000 microns, or about 5 microns to about 200 microns, or about 10 microns to about 100 microns, or about 1 micron or less, or less than, equal to, or greater than about 2 microns, 3, 4, 5, 10, 15, 20, 25, 30, 40, 50, 75, 100, 150, 200, 250, 500, 750 microns, or about 1,000 microns or more.

The method can include controlling the pH of the water prior to contacting with the reactive media, such as raising the pH of the water prior to contacting with the reactive media. The raising of the pH of the water prior to contacting with the reactive media can be performed to an extent such that the pH of the water is elevated but substantially no solid salt including the oxidized phosphate forms prior to contacting the water with the reactive media. The reactive media can further elevate the pH of water contacting the same, such as via calcium hydroxide in the reactive media. Elevating the pH of water contacting the reactive media can allow the reactive media to last longer by dissolving calcium hydroxide from the reactive media at a lower rate per given volume of water treated with the reactive media. The controlling or raising of the pH can occur during the oxidation, separately from the oxidation (e.g., via the addition of any one or more bases described herein), or a combination thereof. The elevated pH of the water during contacting with the reactive media can provide formation of phosphate salts (e.g., calcium phosphate salts) with low solubility in the water. The pH of the water including the oxidized phosphorus prior to contacting with the reactive media can be about 9 to about 14, about 9 to about 13, about 9 to about 12, about 10 to about 12, about 10.5 to about 12, about 11.25 to about 11.75, or about 9 or less, or less than, equal to, or greater than about 9.5, 10, 10.1, 10.2, 10.3, 10.4, 10.5, 10.6, 10.7, 10.8, 10.9, 11, 11.05, 11.1, 11.15, 11.2, 11.25, 11.3, 11.35, 11.4, 11.45, 11.5, 11.55, 11.6, 11.65, 11.7, 11.75, 11.8, 11.85, 11.9, 11.95, 12, 12.1, 12.2, 12.3, 12.4, 12.5, 13, 13.5, or about 14 or more. Controlling the pH can include contacting the water including the oxidized phosphorus during the oxidation, after the oxidation, before contacting with the media, or during contacting with the media, with any one or more suitable bases that can elevate the pH to a desired level, such as with sodium hydroxide, calcium hydroxide, sodium carbonate, sodium bicarbonate, potassium hydroxide, potassium bicarbonate, potassium carbonate, sodium phosphate, disodium hydrogen phosphate, sodium aluminate, sodium borate, sodium acetate, sodium silicate, or a combination thereof.

The method can include a post-reactive media filtration process that includes filtering the water after contact with the reactive media. The post-reactive media filtration can remove particles such as phosphate-containing particles. Such phosphate-containing particles, if not removed, can dissolve and cause an increase in phosphorus concentration in the treated water. The post-reactive media filtration can occur shortly after the contacting with the reactive media, such as prior to any neutralization step, such as while the pH of the water is still sufficiently high to prevent solubilization of one or more solid phosphate salts (e.g., calcium phosphate salts) that are entrained in the water. The post-reactive media filtration can be performed using any suitable filter, such as using a bag filter, sand filtration, or filter cartridges. One or more filters can be used, such as filters having successively smaller pore sizes. The filter can have any suitable pore size, or can remove particles larger than any suitable size, such as about 0.1 micron to about 1,000 microns, about 0.1 microns to about 10 microns, or about 0.5 microns to about 5 microns, or about 0.1 micron or less, or less than, equal to, or greater than about 0.5 microns, 1, 2, 3, 4, 5, 10, 15, 20, 25, 30, 40, 50, 75, 100, 150, 200, 250, 500, 750 microns, or about 1,000 microns or more.

The method can include reducing the pH of the water after contacting with the reactive media to capture the oxidized phosphorus thereon. Before returning the water having decreased phosphorus levels to the environment, the pH can be reduced to environmentally-friendly levels. For example, reducing the pH of the water can include reducing the pH of the water to about 6 to about 11, about 6 to about 9, or about 8 to about 9, or about 6 or less, or less than, equal to, or greater than about 6.5, 7, 7.5, 8, 8.5, 9, 9.5, 10, 10.5, or about 11 or more. Neutralizing the water can be performed by contacting the water with an acid (e.g., in a mixing tank), such as a mineral acid, an organic acid, or a combination thereof. Neutralizing the water can be performed by contacting the water with citric acid, hydrochloric acid, acetic acid, sulfuric acid, or a combination thereof. The neutralization can occur after a post-reactive media treatment step designed to remove insoluble phosphorus salts from the water.

In various embodiments the method can be performed without oxidizing the phosphorus, so long as aqueous oxidized phosphorus is available for contacting with the reactive media. For example, the method can include contacting water including oxidized phosphorus with the reactive media to capture the oxidized phosphorus on or within the reactive media. The method can include contacting water including ferrate-oxidized phosphorus with a calcium-containing reactive media to capture the oxidized phosphorus on the reactive media, in the reactive media, or a combination thereof, as a salt of calcium and phosphate.

Oxidizer.

The method can include contacting water including phosphorus with an oxidizer, to form an oxidized phosphorus. The contacting can be any suitable contacting, such that oxidation of the phosphorus in the water by the oxidizer occurs. The contacting can include mixing, stirring, agitating, shearing, or any combination thereof. The phosphorus resulting from the oxidation can be any suitable form of oxidized phosphorus, such as phosphorus(V). The oxidized phosphorus can be inorganic phosphorus or organic phosphorus. The oxidized phosphorus can be in the form of a phosphate, such as $PO_4^{3-}$, an orthophosphate, a metaphosphate, a polyphosphate, or a combination thereof. The water including the oxidized phosphorus can include one or more suitable counterions for the oxidized phosphorus.

Contacting the oxidizer and the water including phosphorus can include adding a neat oxidizer (e.g., not in solution) to the water including phosphorus. Contacting the oxidizer and water including phosphorus can include contacting a solution of the oxidizer (e.g., an aqueous solution including the oxidizer) and the water including phosphorus to form a reaction mixture. The oxidizer and the phosphorus react to form oxidized phosphorus such as $PO_4^{3-}$. The oxidizer can be any suitable oxidizer, and can include ozone; ferric chloride ($FeCl_3$); a salt including peroxide, permanganate, hypochlorite, chlorate, perchlorate, persulfate, dichromate, or ferrate; or a combination thereof. The oxidizer can be an aqueous solution including ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, ozone, or a combination thereof. The oxidizer can be ferrate, including iron(VI), such as in the form of $FeO_4^{2-}$. The oxidizer or a salt thereof can have any suitable concentration in the solution of the oxidizer that is contacted with the water including phosphorus, such as about 0.001 ppm to about 999,999 ppm, or about 1,000 ppm to about 700,000 ppm, about 1,000 ppm to about 500,000 ppm, about 1,000 ppm to about 100,000 ppm, or about 200,000 ppm to about 500,000 ppm, or about 0.001 ppm or less, or less than, equal to, or greater than about 0.001 ppm, 0.01, 0.1, 1, 5, 10, 20, 50, 100, 200, 500, 1,000, 5,000, 1,000, 20,000, 50,000, 100,000, 200,000, 250,000, 300,000, 350,000, 400,000, 450, 000, 500,000, 550,000, 600,000, 700,000, 800,000, 900,000, or about 999,999 ppm or more. The reaction mixture including the oxidizer and the water including phosphorus can have any suitable starting concentration of oxidizer or a salt thereof, such as about 0.001 ppm to about 100,000 ppm, or about 0.1 ppm to about 1,000 ppm, or about 0.001 ppm or less, or less than, equal to, or greater than about 0.001 ppm, 0.01, 0.1, 1, 5, 10, 20, 50, 100, 200, 500, 1,000, 5,000, 1,000, 20,000, 50,000, or about 100,000 ppm or more.

The oxidizer can be ferrate or can include ferrate. The method can include contacting an aqueous solution of ferrate with the water including phosphorus to form the reaction mixture. The reaction mixture of the ferrate and the water including phosphorus can be mixed or stirred, such as by having low or high amounts of shear applied thereto. The aqueous solution of ferrate, prior to and at the time of combination with the water including phosphorus, can have any suitable ferrate concentration, for example, such as a concentration of ferrate (e.g., ferrate with any one or more suitable counterions, such as sodium ferrate, potassium ferrate, wherein the ferrate concentration given is the concentration of the ferrate ion itself rather than the ferrate salt) of about 0.001 ppm to about 999,999 ppm, about 1,000 ppm to about 700,000 ppm, about 1,000 ppm to about 500,000 ppm, about 1,000 ppm to about 100,000 ppm, about 200,000 ppm to about 500,000 ppm, or about 0.001 ppm or less, or less than, equal to, or greater than about 0.005 ppm, 0.01, 0.05, 0.1, 0.5, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 300, 400, 500, 750, 1,000, 5,000, 1,000, 20,000, 50,000, 100,000, 200,000, 250,000, 300,000, 350,000, 400,000, 450,000, 500,000, 550,000, 600, 000, 700,000, 800,000, 900,000, or about 999,999 ppm or more. After combining the aqueous solution of ferrate and the water including phosphorus, the reaction mixture can have any suitable initial concentration of ferrate (e.g., before the ferrate has reacted to form oxidized materials), such as a concentration of ferrate (e.g., ferrate with any one or more suitable counterions, such as sodium ferrate, potassium ferrate, wherein the ferrate concentration given is the concentration of the ferrate ion itself rather than the ferrate salt) of about 0.001 ppm to about 1,000 ppm, about 0.1 ppm to about 10 ppm, or about 1 ppm to about 5 ppm, or about 0.001 ppm or less, or less than, equal to, or greater than about 0.005 ppm, 0.01, 0.05, 0.1, 0.5, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 300, 400, 500, 750 ppm, or about 1,000 ppm or more.

In some embodiments, an acidic ferrate can be used effectively to oxidize phosphorus at a lower concentration than a basic ferrate, at least partially due to the higher oxidation potential of ferrate under acidic conditions. For example, acidic ferrate can be used effectively to remove phosphorus from water (e.g., water having about 100 parts per billion total phosphorus and about 20 parts per billion dissolved reactive phosphorus concentration, with a final concentration of phosphorus of less than 10 parts per billion for both total and reactive phosphorus) at a concentration of about 0.01 ppm to about 3 ppm, or about 0.1 ppm to about 1.5 ppm, or about 0.5 ppm to about 1 ppm (e.g., about 0.01 ppm or less, or less than, equal to, or greater than 0.05, 0.1, 0.2, 0.4, 0.6, 0.8, 1, 1.2, 1.4, 1.6, 1.8, 2, 2.2, 2.4, 2.6, 2.8, or about 3 or more), while basic ferrate can be used at a higher concentration to bring about the same degree of effectiveness, such as at a concentration of about 0.1 ppm to about 5 ppm, or about 0.5 ppm to about 4 ppm, or about 1 ppm to about 3 ppm (e.g., about 0.1 ppm or less, or less than, equal to, or greater than about 0.05, 0.1, 0.2, 0.4, 0.6, 0.8, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, or about 5 or more). As a result of using less ferrate for phosphorus removal using acidic ferrate, the final iron concentration of the treated water after treatment with the ferrate or after passing through the reactive media can be lower when treated using acidic ferrate as compared to basic ferrate. For example, the final iron concentration after effective removal of phosphorus from water (e.g., water having about 100 parts per billion total phosphorus and about 20 parts per billion dissolved reactive phosphorus concentration, with a final concentration of phosphorus of less than 10 parts per billion for both total and reactive phosphorus) using acidic ferrate can be about 0.01 mg/L to about 5 mg/L, or about 0.1 mg/L to about 4 mg/L, or about 1 mg/L to about 3 mg/L, or about 1.39 mg/L, or about 0.01 mg/L or less, or less than, equal to, or greater than about 0.5 mg/L, 0.8, 0.9, 1, 1.1, 1.2, 1.3, 1.4, 1.5, 1.6, 1.8, 2, 2.5, 3, 3.5, 4, 4.5, or about 5 mg/L or more, while using basic ferrate the final iron concentration can be about 0.01 mg/L to about 3 mg/L, or about 0.05 mg/L to about 2 mg/L, or about 0.1 mg/L to less than 1 mg/L, or about 0.24 mg/L to about 0.46 mg/L, or about 0.01 mg/L or less, or less than, equal to, or greater than 0.05 mg/L, 0.1, 0.15, 0.2, 0.25, 0.3, 0.35, 0.4, 0.45, 0.5, 0.6, 0.7, 0.8, 0.9, 1, 1.2, 1.4, 1.6, 1.8, 2, 2.5 mg/L, or about 3 mg/L or more.

The oxidizer and the water including phosphorus can be contacted for any suitable period of time and at any suitable temperature such that the oxidized phosphorus is formed prior to contacting with the reactive media. The contacting of the oxidizer and the water including phosphorus can include contacting for about 1 s to about 24 h, or about 10 s to about 8 h, or about 1 min to about 60 min, or about 5 min to about 15 min, or about 1 s or less, or less than, equal to, or greater than about 10 s, 30 s, 1 min, 5, 10, 15, 20, 30, 40, 50 min, 1 h, 2, 3, 4, 5, 6, 7, 8, 9, 10, 12, 14, 16, 18, 20, 22, or about 24 h or more. The contacting of the oxidizer and the water can be performed at a temperature of about greater than 0° C. to less than or equal to about 200° C., or about 1° C. to about 100° C., or about 15° C. to about 30° C., or about 1° C. or less, or less than, equal to, or greater than about 5° C., 10, 15, 20, 30, 40, 50, 60, 70, 80, 90, 95, 100, 110, 120, 150, or about 200° C. or more.

A solution of the oxidizer, prior to addition to the water including phosphorus, can have any suitable pH, such as a pH of about 1 to about 14, or about 2 to about 12, or about 1 to about 6, or about 2 to about 4, or about 8 to about 14, or about 9 to about 12, or about 1 or less, or less than, equal to, or greater than about 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, or about 14 or more. After addition to the to the water including phosphorus, and prior to any pH modification of the mixture of the oxidizer and the water including the phosphorus using acid or base, the mixture of the oxidizer and the water including the phosphorus can have any suitable pH, such as about 1 to about 14, or about 2 to about 12, or about 1 to about 6, or about 2 to about 4, or about 8 to about 14, or about 9 to about 12, or about 1 or less, or less than, equal to, or greater than about 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, or about 14 or more.

In some embodiments, the oxidizer is ready to use at the onset of the method. In some embodiments, the method includes preparing or generating at least some part of the oxidizer used in the method for phosphorus oxidation.

Generating Ferrate.

The oxidizer can be or can include ferrate. In some embodiments, the ferrate can be ready to use at the onset of the method. In some embodiments, the method includes generating the ferrate via any suitable method that can generate ferrate, for example, thermally generating the ferrate, electrolytically generating the ferrate, chemically generating the ferrate, or a combination thereof.

The ferrate can be synthesized continuously or in a batch-wise format. The ferrate can be synthesized from an apparatus including a holding chamber for the oxidant and a holding chamber for the iron source, wherein the holding chambers release the oxidant and the iron source at suitable rates to combine and form ferrate in a mixing chamber. In electrolytic methods, the ferrate can be synthesized in a mixing chamber that includes at least two electrodes that provide sufficient electric current to convert a solution of the iron source (optionally including base) to a solution including ferrate.

In some embodiments, the ferrate generated is stable and can be used for oxidation of phosphorus any desired time period after generation. In other embodiments, the generated ferrate is unstable and needs to be used prior to degradation, such as within about 24 h, 8 h, 4 h, or about 24 h or less, or less than, equal to, or greater than about 20 h, 16, h, 12 h, 11, 10, 9, 8, 7, 6, 5, 4, 3, 2, or about 1 h or less. Unstable ferrate solutions can be formed proximate to the site of use, such that degradation of the ferrate prior to use is reduced or minimized.

Generating the ferrate can include combining an oxidizer and an iron source under conditions sufficient to form the ferrate. A ferrate starting material mixture can include the mixture of oxidizer and iron source, along with any solvent (e.g., water) and any other components (e.g., acid, base, or other materials). The iron source can be any suitable one or more iron sources, and can include ferric chloride ($FeCl_3$), ferric bromide, ferrous chloride, ferrous bromide, ferric nitrate, ferrous nitrate, ferric sulfate, ferrous sulfate, ferric phosphate, ferrous phosphate, ferric oxides, ferrous oxides, ferric carbonate, ferrous carbonate, or a combination thereof. In some embodiments, the iron source is ferric chloride ($FeCl_3$). The molar ratio of the one or more oxidizers to the one or more iron sources in the ferrate starting material mixture can be any suitable molar ratio, such as about 1:100 to about 100:1, or about 1:3 to about 3:1, or about 1:100 or less, or less than, equal to, or greater than about 1:50, 1:25, 1:10, 1:5, 1:4, 1:3, 1:2, 1:1, 2:1, 3:1, 4:1, 5:1, 10:1, 25:1, 50:1, or about 100:1 or more.

During formation of the ferrate, the ferrate starting material mixture can be heated to or allowed to heat to any suitable temperature, or can be allowed to react at room temperature. During the reaction to form the ferrate, the ferrate starting material mixture can have any suitable temperature (e.g., as maintained via no heating, heating, exothermic reaction, or a combination thereof), such as about 1° C. to about 500° C., about 25° C. to about 90° C., about 30° C. to about 60° C., about 35° C. (95° F.) to about 50° C. (120° F.), or about 1° C. or less, or less than, equal to, or greater than about 5° C., 10, 15, 20, 25, 30, 35, 40, 45, 50, 55, 60, 65, 70, 75, 80, 85, 90, 95, 100, 110, 120, 150, 175, 200, 250, 300, 400° C., or about 500° C. or more. The temperature can be maintained for any suitable amount of time, such as about 1 s to about 24 h, or about 10 s to about 8 h, or about 10 min to about 2 h, or about 30 min to about 70 minutes, or about 40 minutes to about 60 minutes, or about 1 s or less, or less than, equal to, or greater than about 10 s, 30 s, 1 min, 5, 10, 15, 20, 30, 40, 50 min, 1 h, 2, 3, 4, 5, 6, 7, 8, 9, 10, 12, 14, 16, 18, 20, 22, or about 24 h or more.

In some embodiments, the ferrate can be generated in a solid state from a reaction mixture that is substantially free of solvent. In other embodiments, any suitable proportion of the ferrate starting material mixture can be solvent, such as water, water miscible solvents such as ($C_1$-$C_5$)alcohols, or a combination thereof. The solvent can be about 0 wt % to about 99.999 wt % of the ferrate starting material mixture, or about 10 to about 95 wt %, or about 50 wt % to about 80 wt % of the ferrate starting material mixture, or about 1 wt % or less, or less than, equal to, or greater than about 2 wt %, 3, 4, 5, 10, 20, 30, 40, 50, 60, 70, 80, 90, 95, 96, 97, 98, 99, 99.9, 99.99 wt %, or about 99.999 wt % or more.

The concentration of ferrate formed from the ferrate starting material mixture can be any suitable concentration, such as a concentration of ferrate of about 0.001 ppm to about 999,999 ppm, about 1,000 ppm to about 700,000 ppm, about 1,000 ppm to about 500,000 ppm, about 1,000 ppm to about 100,000 ppm, about 200,000 ppm to about 500,000 ppm, or about 0.001 ppm or less, or less than, equal to, or greater than about 0.005 ppm, 0.01, 0.05, 0.1, 0.5, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 300, 400, 500, 750, 1,000, 5,000, 1,000, 20,000, 50,000, 100,000, 200,000, 300,000, 350,000, 400,000, 450,000, 500,000, 550,000, 600,000, 700,000, 800,000, 900,000, or about 999,999 ppm or more.

The generation of ferrate can be performed in any suitable apparatus. In various embodiments, the ferrate is formed using a Ferrator® supplied by Ferrate Treatment Technologies, LLC. In various embodiments, the ferrate is formed according to one or more of U.S. Pat. Nos. 6,790,429, 6,974,562, 7,476,324, 7,820,025, 9,682,870, and U.S. Patent Publication Nos. 2016/0326011 and 2017/0001878.

During formation of the ferrate from the ferrate starting material mixture, the ferrate starting material mixture can have any suitable pH, such as a pH of about 1 to about 14, or about 2 to about 12, or about 1 to about 6, or about 2 to about 4, or about 8 to about 14, or about 9 to about 12, or about 1 or less, or less than, equal to, or greater than about 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, or about 14 or more. The ferrate can be made from a ferrate starting material that is acidic, neutral, or basic. A solution of the ferrate formed from the ferrate starting material, prior to addition to the water including phosphorus, can have any suitable pH, such as a pH of about 1 to about 14, or about 2 to about 12, or about 1 to about 6, or about 2 to about 4, or about 8 to about 14, or about 9 to about 12, or about 1 or less, or less than, equal to, or greater than about 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, or about 14 or more.

Basic Ferrate Starting Material Mixture.

The ferrate can be generated from a basic ferrate starting material mixture that can include a mixture of base, oxidizer, and iron source, along with any solvent (e.g., water). Generating the ferrate can include combining the base, the oxidizer, and the iron source, under conditions sufficient to form the ferrate. The mixture of base, oxidizer, and iron source can be formed all at once, or two components can be allowed to react prior to adding a third component. For example, the base and oxidizer can react together exothermically, such that it is useful to allow these materials to react first prior to adding the iron source and forming the basic ferrate starting material mixture. In some embodiments, the base and oxidizer can be added together and allowed to react exothermically until the reaction is mostly finished, and then the iron source can be added to form the basic ferrate starting material mixture. Generating the ferrate can include reacting the basic ferrate starting material at room temperature, heating the basic ferrate starting material mixture, or allowing the basic ferrate starting material mixture to heat (e.g., via exothermic reaction to form the ferrate).

During formation of the ferrate from the basic ferrate starting material mixture, the basic ferrate starting material mixture can have any suitable pH, such as a pH of about 8 to about 14, or about 9 to about 12, or about 8 or less, or less than, equal to, or greater than about 8.5, 9, 9.5, 10, 10.5, 11, 11.5, 12, 12.5, 13, 13.5, or about 14 or more. A solution of the ferrate formed from the basic ferrate starting material, prior to addition to the water including phosphorus, can have any suitable pH, such as a pH of about 8 to about 14, or about 9 to about 12, or about 8 or less, or less than, equal to, or greater than about 8.5, 9, 9.5, 10, 10.5, 11, 11.5, 12, 12.5, 13, 13.5, or about 14 or more.

The basic ferrate starting material mixture can include one base or more than one base. The one or more bases can be any suitable proportion of the total amount of the base, the oxidizer, and the iron source, such as about 20 wt % to about 95 wt %, about 50 wt % to about 95 wt %, or about 70 wt % to about 90 wt %, or about 75 wt % to about 85 wt %, or about 20 wt % or less, or less than, equal to, or greater than about 25 wt %, 30, 35, 40, 45, 50, 55, 60, 65, 70, 72, 74, 76, 78, 80, 82, 84, 86, 88, 90, or about 95 wt % or more. The base can be any suitable base, such as sodium hydroxide, calcium hydroxide, sodium carbonate, sodium bicarbonate, potassium hydroxide, potassium bicarbonate, potassium carbonate, sodium phosphate, disodium hydrogen phosphate, sodium aluminate, sodium borate, sodium acetate, sodium silicate, or a combination thereof. In some embodiments, the base is sodium hydroxide (NaOH). The base can be neat or in the form of an aqueous solution of the base when combining with the oxidizer and iron source to form the basic ferrate starting material mixture, such as a 50% (w/v) NaOH aqueous solution. A 50% aqueous NaOH solution can be any suitable overall volume % of the basic ferrate starting material mixture, such as about 20 vol % to about 80 vol %, or about 55 vol % to about 65 vol %, or about 20 vol % or less, or less than, equal to, or greater than about 25 vol %, 30, 35, 40, 45, 50, 55, 60, 65, 70, 75, or about 80 vol % or more.

The basic ferrate starting material mixture can include one oxidizer or more than one oxidizer. The one or more oxidizers can be any suitable proportion of the total amount of the base, the oxidizer, and the iron source, such as about 1 wt % to about 50 wt %, about 3 wt % to about 20 wt %, or about 5 wt % to about 10 wt %, or about 1 wt % or less, or less than, equal to, or greater than about 2 wt %, 3, 4, 5, 6, 7, 8, 9, 10, 11, 12, 13, 14, 15, 16, 17, 18, 19, 20, 22, 24, 26, 28, 30, 35, 40, 45, or about 50 wt % or more. The oxidizer can be any suitable oxidizer, and can include ozone, a peracid; ferric chloride ($FeCl_3$); a salt including peroxide, a superoxide, permanganate, hypochlorite, chlorate, perchlorate, persulfate, dichromate, or ferrate; or a combination thereof. The oxidizer can be ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, ozone, or a combination thereof. In some embodiments, the oxidizer is sodium hypochlorite. The oxidizer can be neat or can be in the form of an aqueous solution of the oxidizer when combining with the base and the iron source to form the basic ferrate starting material mixture, or when combining with the base first and allowed to react prior to adding the iron source, such as a 12.5% (w/v) NaOCl solution. A 12.5% NaOCl aqueous solution can be any suitable overall volume % of the basic ferrate starting material mixture, such as about 10 vol % to about 50 vol %, or about 25 vol % to about 35 vol %, or about 10 vol % or less, or less than, equal to, or greater than about 15 vol %, 20, 22, 24, 26, 28, 30, 32, 34, 36, 38, 40, 45, or about 50 vol % or more.

The basic ferrate starting material mixture can include one iron source or more than one iron source. The one or more iron sources can be any suitable proportion of the total amount of the base, the oxidizer, and the iron source, such as about 1 wt % to about 50 wt %, or about 3 wt % to about 20 wt %, or about 5 wt % to about 15 wt %, or about 1 wt % or less, or less than, equal to, or greater than about 2 wt %, 3, 4, 5, 6, 7, 8, 9, 10, 11, 12, 13, 14, 15, 16, 17, 18, 19, 20, 22, 24, 26, 28, 30, 35, 40, 45, or about 50 wt % or more. The iron source can be ferric chloride ($FeCl_3$), ferric bromide, ferrous chloride, ferrous bromide, ferric nitrate, ferrous nitrate, ferric sulfate, ferrous sulfate, ferric phosphate, ferrous phosphate, ferric oxides, ferrous oxides, ferric carbonate, ferrous carbonate, or a combination thereof. In some embodiments, the iron source is ferric chloride ($FeCl_3$). The iron source can be neat or in the form of an aqueous solution when combining with the base and oxidizer to form the basic ferrate starting material mixture, such as a 40% (w/v) $FeCl_3$ aqueous solution. A 40% $FeCl_3$ aqueous solution can be any suitable overall volume % of the basic ferrate starting material mixture, such as about 1 vol % to about 70 vol %, or about 8 vol % to about 12 vol %, or about 1 vol % or less, or less than, equal to, or greater than about 2 vol %, 3, 4, 5, 6, 7, 8, 9, 10, 11, 12, 13, 14, 15, 16, 17, 18, 19, 20, 25, 30, 35, 40, 45, 50, 55, 60, 65, or about 70 vol % or more. The basic ferrate starting material mixture can include any suitable molar ratio of the oxidizer to the iron source, such as about 1:100 to about 100:1, or about 1:1 to about 5:1, about 1:1 to about 3:1, or about 1:100 or less, or less than, equal to, or greater than about 1:50, 1:25, 1:10, 1:5, 1:4, 1:3, 1:2, 1:1, 2:1, 3:1, 4:1, 5:1, 10:1, 25:1, 50:1, or about 100:1 or more.

During formation of the ferrate, the basic ferrate starting material mixture can be heated to or allowed to heat to any suitable temperature, or can be allowed to react at room temperature. During the reaction to form the ferrate, the ferrate starting material mixture can have any suitable temperature (e.g., as maintained via heating, exothermic reaction, or a combination thereof), such as about 25° C. to about 90° C., about 30° C. to about 60° C., about 35° C. (95° F.) to about 50° C. (120° F.), or about 25° C. or less, or less than, equal to, or greater than about 30° C., 35, 40, 45, 50, 55, 60, 65, 70, 75, 80, 85, or about 90° C. or more. The temperature can be maintained for any suitable amount of time, such as about 1 s to about 24 h, or about 10 s to about 8 h, or about 10 min to about 2 h, or about 30 min to about 70 minutes, or about 40 minutes to about 60 minutes, or about 1 s or less, or less than, equal to, or greater than about 10 s, 30 s, 1 min, 5, 10, 15, 20, 30, 40, 50 min, 1 h, 2, 3, 4, 5, 6, 7, 8, 9, 10, 12, 14, 16, 18, 20, 22, or about 24 h or more.

The base, oxidizer, and iron source can be combined in any order such that ferrate is generated. In some embodiments, the base and oxidizer are combined to create an exotherm (e.g., to about 40-60° C.) and mixing is performed until the reaction mixture cools slightly (e.g., to about 30-40° C.), after which the iron source is added with mixing, optionally using high shear, to form the ferrate.

Acidic Ferrate Starting Material Mixture.

The ferrate can be generated from an acidic ferrate starting material mixture that can include a mixture of acid, oxidizer, and iron source, along with any solvent (e.g., water). Generating the ferrate can include combining an oxidizer and an iron source under acidic conditions that are sufficient to form the ferrate. Throughout this application, ferrate is described as a material formed upon treatment of the iron source with the oxidizer in the acidic solution (e.g., from the "acidic ferrate starting material"); however, in some embodiments, a different oxidizing combination of materials or oxidizer can be produced by the method in addition to or as an alternative to ferrate. All methods of forming ferrate herein from the acidic ferrate starting material mixture are also to be interpreted as possible ways of forming an oxidizing combination of materials or oxidizer including non-ferrate oxidizers alternatively or in addition to ferrate. All acidic solutions described herein as including ferrate can be interpreted as instead including an oxidizing combination of materials or oxidizer including non-ferrate oxidizers alternatively or in addition to ferrate.

During formation of the ferrate from the acidic ferrate starting material mixture, the acidic ferrate starting material mixture can have any suitable pH, such as a pH of about 1 to about 6, or about 1 to about 5, or about 2 to about 4, or about 2 to about 3, or about 1 or less, or less than, equal to, or greater than about 1.5, 2, 2.5, 3, 3.5, 4, 4.5, 5, 5.5, or about 6 or more. A solution of the ferrate formed from the acidic ferrate starting material, prior to addition to the water including phosphorus, can have any suitable pH, such as a pH of about 1 to about 6, or about 1 to about 5, or about 2 to about 4, or about 2 to about 3, or about 1 or less, or less than, equal to, or greater than about 1.5, 2, 2.5, 3, 3.5, 4, 4.5, 5, 5.5, or about 6 or more.

Generating the ferrate can include allowing the acidic ferrate starting material mixture to react at room temperature, heating the acidic ferrate starting material mixture, or allowing the acidic ferrate starting material mixture to heat (e.g., via exothermic reaction to form the ferrate). During the reaction to form the ferrate, the acidic ferrate starting material mixture can have any suitable temperature (e.g., as maintained via no heating, heating, exothermic reaction, or a combination thereof), such as about 1° C. to about 500° C., about 5° C. to about 100° C., about 5° C. to about 40° C., about 10° C. to about 30° C., or about 1° C. or less, or less than, equal to, or greater than about 5° C., 10, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100, 110, 120, 150, 175, 200, 250, 300, 400° C., or about 500° C. or more. The temperature can be maintained for any suitable amount of time, such as about 1 s to about 24 h, or about 10 s to about 8 h, or about 10 min to about 2 h, or about 30 min to about 70 minutes, or about 40 minutes to about 60 minutes, or about 1 s or less, or less than, equal to, or greater than about 10 s, 30 s, 1 min, 5, 10, 15, 20, 30, 40, 50 min, 1 h, 2, 3, 4, 5, 6, 7, 8, 9, 10, 12, 14, 16, 18, 20, 22, or about 24 h or more.

The acidic ferrate starting material mixture can include any one or more acids. The one or more acids can be acids that are added to the mixture, or can be acids that form upon dissolution of other materials in the mixture, such as the iron source, such as $FeCl_3$ (e.g., which can dissolve in water to form HCl). In another example, an aqueous $FeCl_3$ solution can be prepared by dissolving iron metal in HCl. The one or more acids can be a mineral acid, an organic acid, or a combination thereof. The acid can be or include phosphoric acid, sulfuric acid, hydrochloric acid, acetic acid, or a combination thereof. The acid can be or include hydrochloric acid (HCl). The one or more acids can be at any suitable concentration such that the pH of the acidic starting mixture has the desired acidic pH, such as about 1 to about 6, or about 1 to about 5, or about 2 to about 4, or about 2 to about 3, or about 1 or less, or less than, equal to, or greater than about 1.5, 2, 2.5, 3, 3.5, 4, 4.5, 5, 5.5, or about 6 or more.

The acidic ferrate starting material mixture can include one or more oxidizers, such as ozone, a peracid; ferric chloride ($FeCl_3$); a salt including peroxide, a superoxide, permanganate, hypochlorite, chlorate, perchlorate, persulfate, dichromate, or ferrate; or a combination thereof. The oxidizer can be ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, ozone, or a combination thereof. In some embodiments, the oxidizer is potassium permanganate. The oxidizer can be any suitable proportion of the total amount of the oxidizer and the iron source in the acidic ferrate starting material mixture, such as about 10 wt % to about 60 wt %, or about 15 wt % to about 50 wt %, or about 25 wt % to about 40 wt %, or about 10 wt % or less, or less than, equal to, or greater than about 15, 20, 25, 26, 28, 30, 32, 34, 36, 38, 40, 45, 50, 55, or about 60 wt % or more.

The acidic ferrate starting material mixture can include one or more iron sources, and can include ferric chloride ($FeCl_3$), ferric bromide, ferrous chloride, ferrous bromide, ferric nitrate, ferrous nitrate, ferric sulfate, ferrous sulfate, ferric phosphate, ferrous phosphate, ferric oxides, ferrous oxides, ferric carbonate, ferrous carbonate, or a combination thereof. In some embodiments, the iron source is ferric chloride ($FeCl_3$). The one or more iron sources can be any suitable proportion of the total amount of the oxidizer and the iron source in the acidic ferrate starting material mixture, such as about 40 wt % to about 90 wt %, about 50 wt % to about 80 wt %, about 60 wt % to about 70 wt %, or about 40 wt % or less, or less than, equal to, or greater than about 45 wt %, 50, 55, 60, 62, 64, 66, 68, 70, 75, 80, 85, or about 90 wt % or more. The acidic ferrate starting material mixture can include any suitable molar ratio of the oxidizer to the iron source, such as about 1:100 to about 100:1, or about 1:1 to about 1:5, or about 1:1 to about 1:3, or about 1:100 or less, or less than, equal to, or greater than about 1:50, 1:25, 1:10, 1:5, 1:4, 1:3, 1:2, 1:1, 2:1, 3:1, 4:1, 5:1, 10:1, 25:1, 50:1, or about 100:1 or more.

Reactive Media.

The method also includes contacting the water including the oxidized phosphorus with a reactive media to capture the oxidized phosphorus on the reactive media, in the reactive media, or a combination thereof, as a solid salt including the oxidized phosphorus, or as a solid calcium salt. The contacting can include flowing the water through the media, flowing the water to contact the exterior of the media, or a combination thereof. The reactive media can be any suitable reactive media such that contacting the reactive media with the oxidized phosphorus forms a solid calcium salt that is either captured on the media or that can be filtered out of the water after contacting the reactive media. In various embodiments, the pH of the water including the oxidized phosphorus can be high to cause formation of calcium phosphate salts in the reactive media having lower water solubility. The pH of the water including the oxidized phosphorus at the time of contacting with the reactive media can be 9 to 14, 10 to 12, or about 9 or less, or less than, equal to, or greater than about 9.5, 10, 10.5, 11, 11.5, 12, 12.5, 13, 13.5, or about 14 or more.

Prior to contacting the water and the oxidized phosphorus to form the solid salt including the oxidized phosphorus, the water can have any suitable concentration of the reactive element that forms the salt with the phosphorus, such as calcium. For example, prior to the contacting of the water including the oxidized phosphorus and the reactive media, the water including the oxidized phosphorus can have any suitable calcium content, such as about 0 mg/L to about 10,000 mg/L, about 1 mg/L to about 300 mg/L, about 100 mg/L to about 200 mg/L, or about 125 mg/L to about 175 mg/L, or about 1 mg/L or less, or less than, equal to, or greater than about 2 mg/L, 3, 4, 5, 10, 15, 20, 25, 50, 75, 100, 125, 150, 175, 200, 225, 250, 300, 350, 400, 450, 500, 600, 700, 1,000, 1,500, 2,000, 5,000, 7,500 mg/L, or about 10,000 mg/L or more. The concentration of the reactive element (e.g., calcium concentration) in the water including the phosphorus can occur naturally, or can be controlled (e.g., increased). The calcium content can be controlled by addition or contacting of the water with as suitable calcium-containing salt, inorganic compound, or organic compound, such as $CaO$, $Ca(OH)_2$, or a combination thereof.

The contacting of the water with the reactive media can be performed in any suitable way, such that the insoluble salt including the oxidized phosphorus is formed. The method can include contacting the water including the oxidized phosphorus and the reactive media in a containment apparatus, such as in one or more suitable containers or other contacting apparatus, such as in a column, tank, filter, or a combination thereof. Contacting the water including the oxidized phosphorus with the reactive media can include flowing the water through a column or bed including the reactive media, such that the reactive media acts as a reactive filter.

The reactive media includes at least one reactive element that is available to form a solid salt with the oxidized phosphorus. The reactive media can include one reactive element, or more than one reactive element. The reactive element can be in the form of a calcium material that is one or more salts or inorganic compounds that include the reactive element and react to provide the reactive element for formation of the salt, such as $CaO$, $Ca(OH)_2$, or a combination thereof. The one or more salts or inorganic compounds including the reactive element can be any suitable proportion of the reactive media, such as about 0.01 wt % to about 100 wt %, about 5 wt % to about 50 wt %, about 15 wt % to about 25 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more. The reactive element can be iron, lanthanum, calcium, or a combination thereof. The reactive element can be calcium and can be substantially in the form of $CaO$ when dry, such that upon contact with water the $CaO$ transforms to $Ca(OH)_2$ and dissolves into the water.

The concentration of the reactive element in the reactive media can be reported in the form of a compound or salt of the reactive element that the reactive element may or may not actually be in the form of in the reactive media. For example, by immersion of the reactive media in water with agitation for an extended period, the amount of calcium ions that dissolve in the water and become available to form calcium salts can be measured, and can be reported as the concentration of reactive calcium in the reactive media in the form of $CaO$, as if 100% of the reactive calcium were in the form of $CaO$ in the reactive media, but wherein substantially none of, some of, a majority of, or substantially all of the reactive element is actually in the form of $CaO$ in the reactive media prior to contacting with the water. The reactive media can have a concentration of reactive calcium as $CaO$, wherein the reactive calcium can be in the form of any water-soluble salt or inorganic compound including the reactive calcium, of about 0.01 wt % to about 100 wt %, about 5 wt % to about 50 wt %, about 10 wt % to about 25 wt %, about 13 wt % to about 23 wt %, about 14 wt % to about 18 wt %, about 18 wt % to about 22 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more. The reactive media can have an actual concentration of $CaO$ that is the same or different, such as about 0.01 wt % to about 100 wt %, about 5 wt % to about 50 wt %, about 10 wt % to about 25 wt %, about 13 wt % to about 23 wt %, about 14 wt % to about 18 wt %, about 18 wt % to about 22 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more.

Any suitable proportion of the reactive media can be calcium (e.g., as a salt or inorganic compound), such as about 0.01 wt % to about 100 wt %, about 1 wt % to about 40 wt %, about 5 wt % to about 30 wt %, about 10 wt % to about 20 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more.

The reactive media can include or can be a ceramic (e.g., at least partially vitrified reactive media starting material) that includes the salt or inorganic compound that provides the reactive element (e.g., the reactive material). The salt or inorganic compound that includes the reactive element is located in the ceramic such that it is available to contact water flowing by and through the reactive media and react to form the solid phosphate salt. For example, the ceramic can include an approximately homogeneous distribution of the reactive material. The reactive material can occupy intersticies in the ceramic matrix. The ceramic can have any suitable porosity, such that water can flow through the media to a desired degree to contact the reactive material therein. The ceramic can have any suitable porosity, such as about 0.01 to about 0.9 (i.e., 1% to 90% void space), or about 0.1 to about 0.5, or about 0.01 or less, or greater than 0.05, 0.1, 0.15, 0.2, 0.25, 0.3, 0.35, 0.4, 0.45, 0.5, 0.55, 0.6, 0.7, 0.8, or about 0.9 or more. The porosity can be measured by the amount of vacuum that can be generated when a single pellet is placed in a tube having an inside diameter that fits tight around the outside diameter of the pellet, and applying a 2.5 ft$^3$/min (4.25 m$^3$/h) vacuum pump to the other end of the tube; such a technique as performed on various embodiments of the reactive media can give a vacuum of about 3 cm Hg to about 40 cm Hg, or about 20 cm Hg to about 25 cm Hg, or about 3 cm Hg or less, or less than, equal to, or greater than about 3 cm Hg, 4, 5, 6, 8, 10, 12, 14, 16, 18, 19, 20, 21, 22, 23, 24, 25, 26, 27, 28, 30, 32, 34, 36, 38 cm Hg, or about 40 cm Hg or more.

The ceramic can be any suitable proportion of the reactive media, such as about 0.01 wt % to about 100 wt %, about 50 wt % to about 99 wt %, about 80 wt % to about 99 wt %, or about 0.01 wt % or less, or less than, equal to, or greater than about 0.1 wt %, 1, 2, 4, 5, 10, 15, 20, 25, 30, 35, 40, 45, 50, 55, 60, 65, 70, 75, 80, 81, 82, 83, 84, 85, 86, 87, 88, 89, 90, 91, 92, 93, 94, 95, 96, 97, 98, 99, 99.9 wt %, or about 99.99 wt % or more. The ceramic can include silicates such as calcium silicates, other silicates (e.g., aluminum silicates, potassium silicates, sodium silicates, and others), or a combination thereof. The calcium silicate can be any suitable calcium silicate, such as $CaSiO_3$, $Ca_2SiO_4$, $Ca_3SiO_5$, $Ca_3Si_2O_7$, or a combination thereof. Calcium silicates, such as calcium silicates formed from compounds including reactive calcium in the reactive media starting material, calcium silicates formed from other materials, or a combination thereof, can form any suitable proportion of the reactive media, such as about 0.01 wt % to about 99 wt %, or about 0.1 wt % to about 80 wt %, or about 1 wt % to about 10 wt %, or about 1 wt % to about 5 wt %, or about 2 wt % to about 4 wt %, or about 0.01 wt % or less, or less than, equal to, or greater than about 0.05 wt %, 0.1, 0.5, 1, 2, 3, 4, 5, 6, 7, 8, 9, 10, 15, 20, 25, 30, 40, 50, 60, 70, 80, 90, or about 95 wt % or more of the reactive media.

The solid phosphate salt formed from the reactive material and the oxidized phosphorus can be formed at any suitable location, such as within the reactive media, on the exterior of the reactive media, as solid particles captured by a filter bed that can include reactive media and other particles, as solid particles entrained in water passing through the reactive media, as solid particles that exit the reactive media and are captured by a post-reactive media filtration, or a combination thereof.

In some embodiments, the reactive media includes calcium, and the reactive calcium in the reactive media is in the form of a calcium material that is a calcium salt, an inorganic calcium compound, or a combination thereof. The calcium material can be or can include calcium oxide (CaO), calcium hydroxide ($Ca(OH)_2$), or a combination thereof. The calcium material can react with the oxidized phosphorus to provide a solid calcium phosphate salt. The solid calcium phosphate salt can be any suitable calcium phosphate salt, such as monocalcium phosphate ($Ca(H_2PO_4)_2$), dicalcium phosphate ($CaHPO_4$), tricalcium phosphate ($Ca_3(PO_4)_2$), amorphous calcium phosphate, dicalcium diphosphate ($Ca_2P_2O_7$), calcium triphosphate ($Ca_5(P_3O_{10})_2$), hydroxyapatite ($Ca_5(PO_4)_3(OH)$), apatite ($Ca_{10}(PO_4)_6(OH, F, Cl, Br)_2$), tetracalcium phosphate ($Ca_4(PO_4)_{2}O$), a hydrate thereof, or a combination thereof. The solid calcium phosphate salt can include tricalcium phosphate ($Ca_3(PO_4)_2$), which can be formed predominately or in increased proportions to other calcium phosphates due to an elevated pH of the water including the oxidized phosphorus at the time of contacting with the reactive media. Tricalcium phosphate can be any suitable proportion of the overall amount of solid phosphate salt formed during the method, such as about 0 wt % to about 100 wt %, about 50 wt % to about 100 wt %, or less than, equal to, or equal to about 1 wt % or less, or less than, equal to, or greater than about 5 wt %, 10, 15, 20, 25, 30, 35, 40, 45, 50, 55, 60, 65, 70, 75, 80, 85, 90, 95, 96, 97, 98, 99, 99.9 wt %, or about 99.99 wt % or more. For example, the total proportion of the solid calcium salt that is hydroxyapatite can be about 0 wt % to about 80 wt %, or about 0 wt % to about 50 wt %, or about 0 wt % to about 20 wt %, or about 1 wt % or less, or less than, equal to, or greater than about 2 wt %, 3, 4, 5, 10, 15, 20, 25, 30, 35, 40, 45, 50, 55, 60, 65, 70, 75, 80, 85, 90, or about 95 wt % or more. The species of calcium salt formed with the oxidized phosphorus can depend at least to some extent on the concentration of calcium in the water including the oxidized phosphorus, on the pH of the water including the oxidized phosphorus at the time of contacting with the reactive media, and on the magnesium content of the reactive media; the method can include controlling one or more of these factors such that the production of calcium phosphate salts other than tricalcium phosphate is reduced or eliminated, or such that the production of hydroxyapatite is reduced or eliminated.

The reactive media can include magnesium, such as in the form of an inorganic compound or a salt that includes the magnesium, such as in the form of magnesium oxide, magnesium carbonate, or a combination thereof. For example, during heat treatment of a reactive media starting material including dolomitic limestone (e.g., $CaMg(CO_3)_2$ and $CaCO_3$), the $CaMg(CO_3)_2$ and the $CaCO_3$ can be converted into CaO and MgO. The magnesium can decrease the amount of less desirable calcium phosphate salts formed (e.g., calcium phosphate salts having a lower ratio of calcium atoms to phosphorus atoms, such as hydroxyapatite), thereby increasing the amount of more desirable calcium phosphate salts formed such as tricalcium phosphate. The magnesium in the reactive media can stabilize tricalcium phosphate and can disrupt and hinder formation of other forms of calcium phosphate such as hydroxyapatite. The magnesium can be any suitable proportion of the reactive media, such as about 0 wt % to about 30 wt %, about 0.01 wt % to about 30 wt %, about 0.1 wt % to about 20 wt %, about 0.1 wt % to about 5 wt %, about 1 wt % to about 2 wt %, or about 0.01 wt % or less, or less than, equal to, or greater than about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 6, 8, 10, 15, 20, 25 wt %, or about 30 wt % or more. The salt or inorganic compound that includes the magnesium (e.g., MgO, $MgCO_3$, or a combination thereof) can be any suitable proportion of the reactive media, such as about 0.01 wt % to about 90 wt %, or about 0.1 to about 60 wt %, or about 0.1 to about 15 wt %, or about 1 to about 7 wt %, or about 0.01 wt % or less, or less than, equal to, or greater than about 0.1 wt %, 1, 2, 3, 4, 5, 6, 7, 8, 9, 10, 12, 14, 16, 18, 20, 25, 30, 35, 40, 45, 50, 55, 60, 65, 70, 75, 80, 85 wt %, or about 90 wt % or more.

The reactive media can be formed from a reactive media starting material using suitable processing. The reactive media can be ready for use at the onset of the method. In other embodiments, the method includes preparing the reactive media.

The reactive media starting material can include clay, such as one clay or more than one clay. The one or more clays can be any suitable proportion of the reactive media starting material, such as about 0 wt % to about 99 wt %, about 1 wt % to about 99 wt %, about 50 wt % to about 90 wt %, or about 50 wt % to about 80 wt %, or about 55 wt % to about 70 wt %, or about 1 wt % or less, or less than, equal to, or greater than about 2 wt %, 3, 4, 5, 10, 15, 20, 25, 30, 35, 40, 45, 50, 52, 54, 56, 58, 60, 62, 64, 68, 70, 72, 74, 76, 78, 80, 82, 84, 86, 88, 90, 92, 94, 96, 98, 99, 99.9 wt %, or about 99.99 wt % or more. The clay can include calcium silicates, iron silicates, aluminum silicates, or a combination thereof. The clay can include kaolinite, illite, gibbsite, silt, silica, aluminum oxide, or a combination thereof. The clay can have any suitable amount of silica. For example, the clay can be about 10 wt % to about 90 wt % silica, or about 35 wt % to about 85 wt %, about 55 wt % to about 65 wt %, about 58 wt % to about 64 wt %, or about 10 wt % or less, or less than, equal to, or greater than about 15 wt %, 20, 25, 30, 35, 40, 45, 50, 55, 60, 65, 70, 75, 80, 85 wt %, or about 90 wt % or more. Alumina ($Al_2O_3$) can be about 1 wt % to about 50 wt % of the clay, about 10 wt % to about 30 wt %, about 15 wt % to about 20 wt %, or about 1 wt % or less, or less than, equal to, or greater than about 5 wt %, 10, 15, 20, 25, 30, 35, 40, 45 wt %, or about 50 wt % or more. Iron oxide ($Fe_2O_3$) can be about 0 wt % to about 50 wt % of the clay, about 1 wt % to about 20 wt %, about 5 wt % to about 10 wt %, or about 1 wt % or less, or less than, equal to, or greater than about 2 wt %, 3, 4, 5, 6, 7, 8, 9, 10, 15, 20, 25 wt %, or about 30 wt % or more. Calcium oxide (CaO) can be about 0 wt % to about 30 wt % of the clay, about 0.1 wt % to about 5 wt %, about 0.5 wt % to about 1 wt %, or about 0.1 wt % or less, or less than, equal to, or greater than about 0.2 wt %, 0.4, 0.6, 0.8, 1, 1.2, 1.4, 1.6, 1.8, 2, 2.5, 3, 4, 5, 6, 8, 10, 15, 20, 25 wt %, or about 30 wt % or more. Magnesium oxide (MgO) can be about 0 wt % to about 30 wt % of the clay, about 0.1 wt % to about 10 wt %, about 1 wt % to 3 wt %, or about 0.1 wt % or less, or less than, equal to, or greater than about 0.2 wt %, 0.4, 0.6, 0.8, 1, 1.2, 1.4, 1.6, 1.8, 2. 2.2, 2.4, 2.6, 2.8, 3, 3.5, 4, 4.5, 5, 6, 7, 8, 9, 10, 12, 14, 16, 18, 20, 25 wt %, or about 30 wt % or more.

The reactive media starting material can include a calcium source. The calcium source can be any suitable proportion of the reactive media starting material, such as about 0.01 wt % to about 99 wt %, about 1 wt % to about 50 wt %, about 5 wt % to about 20 wt %, about 10 wt % to about 15 wt %, or about 0.01 wt % or less, or less than, equal to, or greater than about 0.1 wt %, 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 96, 97, 98 wt %, or about 99 wt % or more. The calcium source can be any material that includes calcium and that forms the reactive media. The calcium source can be a calcium silicate (e.g., $CaSiO_3$, $Ca_2SiO_4$, $Ca_3SiO_5$, $Ca_3Si_2O_7$, or a combination thereof), CaO, $Ca(OH)_2$, $CaCO_3$, limestone, dolomitic limestone, or a combination thereof. The calcium source can transform into a ceramic in the reactive media, into the calcium material in the reactive media that reacts with the oxidized phosphorus to form the solid phosphate salt, or a combination thereof. The calcium source can be or can include calcium carbonate ($CaCO_3$). The calcium source can be or include limestone. The calcium source can be or include dolomitic limestone (e.g., $CaMg(CO_3)_2$ and $CaCO_3$). The calcium source can be or can include calcium carbonate and calcium oxide, such as dolomitic limestone and calcium oxide, such as wherein the calcium source is about 10 wt % to about 90 wt % dolomitic limestone and about 90 wt % to about 10 wt % calcium oxide. Any suitable proportion of the reactive media starting material can be calcium, such as about 0.01 wt % to about 100 wt %, about 1 wt % to about 40 wt %, about 1 wt % to about 30 wt %, about 1 wt % to about 20 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more.

The calcium source in the reactive media starting material can provide any suitable amount of reactive calcium as CaO, wherein the reactive calcium can be in the form of any water-soluble salt or inorganic compound including the reactive calcium, such as about 0.01 wt % to about 100 wt % reactive calcium as CaO in the reactive starting material, about 5 wt % to about 50 wt %, about 15 wt % to about 25 wt %, about 18 wt % to about 22 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more. The amount of reactive calcium as CaO in the reactive media starting material can be the same or different as the amount of reactive calcium as CaO in the reactive media. The vitrification of the reactive media starting material can cause some of the salt or inorganic compound including the reactive calcium in the reactive media starting material to transform into calcium silicates having calcium that is not available for dissolution or reaction with oxidized phosphorus during contacting with water. Any suitable proportion of the reactive calcium as CaO in the reactive media starting material can be retained as reactive calcium as CaO in the reactive media, such as about 1 wt % to about 100 wt %, about 80 wt % to about 95 wt %, or about 1 wt % or less, or less than, equal to, or greater than about 5 wt %, 10, 15, 20, 25, 30, 35, 40, 45, 50, 55, 60, 65, 70, 75, 80, 81, 82, 83, 84, 85, 86, 87, 88, 89, 90, 91, 92, 93, 94, 95, 96, 97, 98, 99, 99.9 wt %, or about 99.99 wt % or more. Any suitable proportion of the reactive calcium as CaO in the reactive media starting material can be transformed into calcium silicates in the reactive media or otherwise lost during the vitrification process to form the reactive media, such as about 1 wt % to about 99 wt %, about 5% to about 20%, or about 1 wt % or less, or less than, equal to, or greater than about 2 wt %, 3, 4, 5, 6, 7, 8, 9, 10, 11, 12, 13, 14, 15, 16, 17, 18, 20, 22, 24, 26, 28, 30, 35, 40, 45, 50, 55, 60, 65, 70, 75, 80, 85, 90 wt % or about 95 wt % or more.

Any suitable proportion of the reactive media starting material can be CaO, such as about 0 wt % to about 100 wt %, or about 0.1 wt % to about 50 wt %, or about 0.1 wt % to about 10 wt %, or about 0.01 wt % or less, or less than, equal to, or greater than about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.5, 4, 4.5, 5, 6, 7, 8, 9, 10, 12, 14, 16, 18, 20, 25, 30, 35, 40, 45, 50, 55, 60, 65, 70, 75, 80, 85, 90 wt %, or about 95 wt % or more.

Any suitable proportion of the reactive media starting material can be $CaCO_3$, such as about 0 wt % to about 100 wt %, 0.01 wt % to about 100 wt %, or about 0.1 wt % to about 20 wt %, or about 1 wt % to about 5 wt %, or about 2 wt % to about 5 wt %, or about 0.01 wt % or less, or less than, equal to, or greater than about 0.1 wt %, 0.5, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 4, 4.5, 5, 6, 7, 8, 9, 10, 15, 20, 25, 30, 35, 40, 45, 50, 55, 60, 65, 70, 75, 80, 85, 90, 95, or about 99 wt % or more.

The reactive media starting material can include a magnesium source. The magnesium source can by any suitable proportion of the reactive media starting material, such as about 0 wt % to about 99 wt %, about 0.01 wt % to about 99 wt %, about 1 wt % to about 50 wt %, about 5 wt % to about 20 wt %, about 10 wt % to about 15 wt %, or about 0.01 wt % or less, or less than, equal to, or greater than about 0.1 wt %, 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 96, 97, 98 wt %, or about 99 wt % or more. The magnesium source can be dolomitic limestone, dolomite ($CaMg(CO_3)_2$), magnesium oxide, magnesium carbonate, fly ash, cement kiln dust, an industrial byproduct including Mg, or a combination thereof. In some embodiments, the magnesium source is dolomitic limestone. The magnesium source and the calcium source can be the same material (e.g., dolomitic limestone). Magnesium can be any suitable proportion of the reactive media starting material, such as about 0 wt % to about 30 wt %, about 0.01 wt % to about 30 wt %, about 0.1 wt % to about 20 wt %, about 0.1 wt % to about 5 wt %, about 1 wt % to about 2 wt %, or about 0.01 wt % or less, or less than, equal to, or greater than about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 6, 8, 10, 15, 20, 25 wt %, or about 30 wt % or more.

Any suitable proportion of the reactive media starting material can be dolomite ($CaMg(CO_3)_2$), such as about 0 wt % to about 100 wt %, about 0.01 wt % to about 100 wt %, 1 wt % to about 30 wt %, 5 wt % to about 10 wt %, or about 0.01 wt % or less, or less than, equal to, or greater than about 0.1 wt %, 1, 2, 3, 4, 5, 6, 7, 8, 9, 10, 11, 12, 13, 14, 15, 16, 17, 18, 19, 20, 22, 24, 26, 28, 30, 32, 34, 36, 38, 40, 45, 50, 55, 60, 65, 70, 75, 80, 85, 90, 95, 96, 97, 98 wt %, or about 99 wt % or more.

Any suitable proportion of the reactive media starting material can be dolomitic limestone ($CaCO_3$ and $CaMg(CO_3)_2$), such as about 0 wt % to about 99 wt %, about 0.01 wt % to about 99 wt %, about 1 wt % to about 50 wt %, about 5 wt % to about 20 wt %, about 5 wt % to about 15 wt %, or about 0.01 wt % or less, or less than, equal to, or greater than about 0.1 wt %, 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 96, 97, 98 wt %, or about 99 wt % or more. Any suitable proportion of the dolomitic limestone can be dolomite, such as about 1 wt % to about 99 wt %, or about 60 wt % to about 80 wt %, or about 1 wt % or less, or less than, equal to, or greater than about 2, 3, 4, 5, 10, 15, 20, 25, 30, 35, 40, 45, 50, 55, 60, 62, 64, 66, 68, 70, 72, 74, 76, 78, 80, 85, 90, 95, 96, 97, 98 wt %, or about 99 wt % or more. Any suitable proportion of the dolomitic limestone can be magnesium, such as about 0.1 wt % to about 60 wt %, about 1 wt % to about 30 wt %, about 5 wt % to about 15 wt %, or about 0.1 wt % or less, or less than, equal to, or greater than about 1 wt %, 2, 3, 4, 5, 6, 7, 8, 9, 10, 11, 12, 13, 14, 15, 16, 17, 18, 19, 20, 25, 30, 35, 40, 45, 50, 55 wt %, or about 60 wt % or more.

The reactive media starting material can include an organic material. The organic material can be any suitable proportion of the reactive media, such as about 0 wt % to about 50 wt %, about 0.01 wt % to about 50 wt %, or about 1 wt % to about 20 wt %, about 1 wt % to about 10 wt %, or about 1 wt % or less, or less than, equal to, or greater than about 2 wt %, 3, 4, 5, 6, 7, 8, 9, 10, 11, 12, 13, 14, 15, 16, 17, 18, 19, 20, 22, 24, 26, 28, 30, 35, 40, 45 wt % or about 50 wt % or more of the reactive media starting material. The organic material can be or can include saw dust, wood residue, cellulose fiber (e.g., a byproduct of manufacturing paper products), lake bottom sludge, peat (e.g., Canadian peat, Canadian peat fines, dust residue from Canadian peat processing, or a combination thereof), organic agricultural residue (e.g., corn cobs, corn, rice hulls, coconut shells, and the like), or a combination thereof.

The reactive media starting material can include a clay source, a calcium source, a magnesium source, and an organic material. The calcium source and the magnesium source can be the same. In some embodiments, the reactive media starting material includes a non-clumping clay, CaO (e.g., as CaO, or as a hydrated form such as $Ca(OH)_2$), dolomitic limestone, and peat.

The reactive media can be formed from the reactive media starting material using suitable processing. Forming the reactive media can include drying a wet reactive media starting material to form the reactive media starting material. Forming the reactive media can include extruding the reactive media starting material. Forming the reactive media can include vitrifying the reactive media starting material (e.g., vitrifying the extruded reactive media starting material), to form the reactive media.

A wet reactive media starting material (e.g., any reactive media starting material including water) can have any suitable moisture content, such as about 0.001 wt % to about 50 wt %, or about 10 wt % to about 30 wt %, or about 15 wt % to about 20 wt %, or about 0.001 wt % or less, or less than, equal to, or greater than about 0.01 wt %, 0.1, 1, 2, 3, 4, 5, 6, 8, 10, 12, 14, 16, 18, 20, 22, 24, 26, 28, 30, 35, 40, 45 wt %, or about 50 wt % or more. A wet reactive media can be a slurry, a wet solid, or any combination thereof. Drying the reactive media starting material can be conducted in any suitable way, such as including decanting of liquid, filtration, heating to remove water, placing under reduced pressure, exposing fresh surface area by stirring or breaking up the material, or a combination thereof. Heating the reactive media during a drying process can include heating to any suitable temperature, such as about 30° C. to about 3,000°

C., or about 30° C. to about 300° C., or about 30° C. or less, or less than, equal to, or greater than about 40° C., 50, 75, 100, 125, 150, 175, 200, 225, 250, 275, 300, 350, 400, 450, 500, 750, 1,000, 1,500, 2,000, 2,500, or about 3,000° C. or more. The drying can be performed until the reactive media starting material has a moisture content of about 0 wt % to about 50 wt %, or about 10 wt % to about 30 wt %, or about 15 wt % to about 20 wt %, or about 1 wt % or less, or less than, equal to, or greater than about 2, 3, 4, 5, 6, 8, 10, 12, 14, 16, 18, 20, 22, 24, 26, 28, 30, 35, 40, 45 wt %, or about 50 wt % or more. A separate drying step can be omitted, such as when the moisture content of the reactive media starting material is about 0 wt % to about 30 wt %, or about 15 wt % to about 20 wt %, or about 1 wt % or less, or less than, equal to, or greater than about 2, 3, 4, 5, 6, 8, 10, 12, 14, 16, 18, 20, 22, 24, 26, 28 wt %, or about 30 wt % or more. With or without a separate drying step, a vitrification step can cause at least some drying. Addition of CaO to wet clay can cause formation of $Ca(OH)_2$ and dehydration of the clay, with corresponding effects on the texture of the material, such that, in some embodiments, wet clay can be dehydrated to a suitable consistency for extrusion by adding CaO thereto.

Vitrifying the reactive media starting material can include heating to any suitable temperature such that at least some vitrification of the reactive media starting material occurs to form the reactive media, such as to form a ceramic portion of the reactive media. Vitrifying can include heating to a temperature of about 500° C. to about 3000° C., about 900° C. to about 1100° C., or about 500° C. or less, or less than, equal to, or greater than about 600° C., 700, 800, 900, 950, 1,000, 1,050, 1,100, 1,200, 1,300, 1,400, 1,500, 1,600, 2,000, 2,500° C., or about 3,000° C. or more. The temperature can be maintained for a suitable time period such as about 1 s to about 24 h, or about 10 s to about 8 h, or about 10 min to about 30 min, or about 1 s or less, or less than, equal to, or greater than about 10 s, 30 s, 1 min, 5, 10, 15, 20, 30, 40, 50 min, 1 h, 2, 3, 4, 5, 6, 7, 8, 9, 10, 12, 14, 16, 18, 20, 22, or about 24 h or more.

Vitrifying the reactive media starting material to form the reactive media can include forming a calcium silicate ceramic from calcium and silicon in the reactive media starting material. The calcium silicate can include $CaSiO_3$, $Ca_2SiO_4$, $Ca_3SiO_5$, $Ca_3Si_2O_7$, or a combination thereof. Vitrifying the reactive media starting material can include forming a source of reactive element in the reactive media, such as a calcium material. For example, CaO can be formed, such as from $Ca(OH)_2$ in the reactive media starting material or from other components. In some embodiments, at least part of the source of reactive element in the reactive media, such as at least part of the calcium material (e.g., CaO), is in the reactive media starting material and is preserved through the process of forming the reactive media.

Before or during the vitrification or drying, the reactive media starting material or the reaction product thereof can be extruded. The extrusion can be performed with any suitable amount of pressure, such that a desired density of the reactive media is achieved. In some embodiments, the pressure used during the extrusion is low or minimized, such that any increase in density of the resulting extruded reactive media is low or minimized. Prior to or during an extrusion, a suitable amount of water can be added to give the reactive media starting material a texture that is suitable for extrusion, such as to give the reactive media starting material a moisture content of about 10 wt % to about 30 wt %, or about 15 wt % to about 20 wt %, or about 1 wt % or less, or less than, equal to, or greater than about 2, 3, 4, 5, 6, 8, 10, 12, 14, 16, 18, 20, 22, 24, 26, 28 wt %, or about 30 wt % or more. The extruded pieces can have a largest cross-sectional dimension of any suitable size, such as about 1 cm to about 100 cm, 5 cm to about 20 cm, 9 cm to about 13 cm, or about 1 cm or less, or less than, equal to, or greater than about 2 cm, 3, 4, 5, 10, 15, 20, 25, 30, 35, 40, 45, 50, 55, 60, 65, 70, 75, 80, 85, 90, 95 cm, or about 100 cm or more. During or after extrusion, the extruded reactive media can be cut or allowed to break into chunks, such as via approximately cross-sectional cuts or breaks, of any suitable size, such as about 1 cm to about 100 cm, 5 cm to about 20 cm, 9 cm to about 13 cm, or about 1 cm or less, or less than, equal to, or greater than about 2 cm, 3, 4, 5, 10, 15, 20, 25, 30, 35, 40, 45, 50, 55, 60, 65, 70, 75, 80, 85, 90, 95 cm, or about 100 cm or more. During any drying and during the vitrification, the extruded reactive media starting material can shrink slightly, such as about 0.01% to about 30%, about 1% to about 20%, or about 5% to about 15%, in each dimension.

The reactive media starting material can have a composition such that vitrification can occur at a lower temperature then other similar reactive media starting material compositions. In some embodiments, the lower vitrification temperature is at least in part due to the reactive starting material having a concentration of calcium (Ca) and silicon (Si) such that the mole % Si in Ca is closer to a eutectic mole % Si in Ca (e.g., on a Ca—Si binary phase diagram, or on another phase diagram corresponding to the reactive media starting material composition) having a local or global minimum melting point temperature compared to similar compositions having different mole % of Si in Ca. Forming the reactive media from the reactive media starting material can include controlling the mole % Si in Ca during formation of the reactive media (e.g., by appropriately choosing the composition of the reactive media starting material) to be about 1% to about 99%, about 60% to about 90%, about 70% to about 90%, or about 80% to about 90%, or about 83% to about 90%, or about 1% or less, or less than, equal to, or greater than about 5%, 10, 15, 20, 25, 30, 35, 40, 45, 50, 55, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98%, or about 99 mol % or more. The mole % Si in Ca can be such that the melting point of the reactive media starting material is within about 0° C. to about 300° C. of a eutectic point melting temperature of a phase diagram corresponding to the reactive media starting material, or about 0° C. to about 200° C., about 0° C. to about 100° C., about 0° C. to about 50° C., about 0° C. to about 10° C., about 0° C. to about 5° C., or about 1° C. or less, or about 2, 3, 4, 5, 6, 7, 8, 9, 10, 12, 14, 16, 18, 20, 25, 30, 35, 40, 50, 60, 70, 80, 90, 100, 110, 120, 130, 140, 150, 160, 170, 180, 190, 200, 205, 210, 215, 220, 225, 230, 235, 240, 245, 250, 255, 260, 265, 270, 275, 280, 285, 290, 295° C., or within about 300° C. or more. In some embodiments, the temperature used during formation of the reactive media from the reactive media starting material (e.g., the temperature required for at least partial vitrification of the reactive media starting material) does not exceed about 1,100° C., or about 1,070° C., or about 1,062° C., or about 1,065, 1,070, 1,080, 1,090, 1,100, 1,150, 1,200, 1,250, 1,300, 1,400, 1,500, 1,600, 1,700, 1,800, 1,900, 2,000° C., or about 2,100° C. or more.

After vitrification, the finished reactive media can have any suitable moisture content, prior to contacting with the water including the oxidized phosphorus, such as about 0 wt % to about 20 wt %, or about 0 wt % to about 10 wt %, about 0.001 wt % to about 5 wt %, or about 0.001 wt % or less, or less than, equal to, or greater than about 0.01 wt %, 0.1, 1, 2, 3, 4, 5, 6, 7, 8, 9, 10, 12, 14, 16, 18 wt %, or about 20 wt % or more.

The reactive media can have any suitable mole % Si in Ca, such as about 1% to about 99%, about 60% to about 90%, about 70% to about 90%, or about 80% to about 90%, or about 83% to about 90%, or about 1% or less, or less than, equal to, or greater than about 5%, 10, 15, 20, 25, 30, 35, 40, 45, 50, 55, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98%, or about 99 mol % or more.

The reactive media can have any suitable total capacity for forming or capturing the solid phosphate salt, such as about 0.01 g to about 0.5 g of phosphorus per g of reactive media prior to contacting with the water including the oxidized phosphorus, or about 0.01 g to about 0.2 g, or about 0.14 g to about 0.16 g, or about 0.01 g or less, or less than, equal to, or greater than about 0.02 g, 0.03, 0.04, 0.05, 0.06, 0.08, 0.09, 0.10, 0.11, 0.12, 0.13, 0.14, 0.15, 0.16, 0.17, 0.18, 0.20, 0.22, 0.24, 0.3, 0.4 g, or about 0.5 g or more. The reactive media can capture about 0.01 g to about 0.5 g of phosphorus per $cm^3$ of reactive media prior to contacting with the water including the oxidized phosphorus, or about 0.01 g to about 0.2 g, or about 0.01 g to about 0.14 g, or about 0.01 g or less, or less than, equal to, or greater than about 0.02 g, 0.022, 0.024, 0.026, 0.028, 0.029, 0.03, 0.031, 0.032, 0.033, 0.034, 0.035, 0.036, 0.037, 0.038, 0.039, 0.04, 0.045, 0.05, 0.055, 0.06, 0.08, 0.09, 0.10, 0.11, 0.12, 0.13, 0.14, 0.15, 0.16, 0.17, 0.18, 0.20, 0.22, 0.24, 0.28, 0.3, 0.4 g, or about 0.5 g or more. The flow rate through the media can be any suitable flow rate, such as about 10 GPM (37.9 LPM) per square foot of media (0.28 $m^3$) or less, or about 100 GPM or less, or about 0.001 GPM to about 100 GPM, or about 0.01 GPM to about 10 GPM, or less than, equal to, or greater than about 0.001 GPM, 0.01, 0.1, 1, 2, 3, 4, 5, 6, 7, 8, 9, 10, 25, 50, 75, or about 100 GPM per square foot of media or more.

Apparatus.

In various embodiments, the present invention provides an apparatus for removing phosphorus from water. The apparatus can be any suitable apparatus that can be used to perform an embodiment of the method described herein including oxidizing phosphorus in water or treating the phosphorus with $FeCl_3$ and subsequently contacting the oxidized phosphorus with a reactive media to form a solid salt including the oxidized phosphorus. The apparatus can be any suitable apparatus that can be used to perform an embodiment of the method described herein including contacting an oxidized phosphorus with a reactive media to form a solid salt including the oxidized phosphorus.

EXAMPLES

Various embodiments of the present invention can be better understood by reference to the following Examples which are offered by way of illustration. The present invention is not limited to the Examples given herein.

The red clay used in the Examples was obtained from a Brick manufacturer in Iowa, and had the analysis shown in Table 1.

TABLE 1

Red clay analysis.

| MATERIAL | DRY WEIGHT % | FIRED WEIGHT % |
| --- | --- | --- |
| Loss on ignition (1050° C.) | 6.5 | |
| Silica ($SiO_2$) | 59.6 | 63.7 |
| Alumina ($Al_2O_3$) | 17.7 | 18.9 |
| Iron Oxide ($Fe_2O_3$) | 8.6 | 9.2 |
| Titanium Oxide ($TiO_2$) | 1.0 | 1.1 |
| Calcium Oxide (CaO) | 0.78 | 0.81 |
| Magnesium Oxide (MgO) | 1.9 | 2.0 |
| Potassium Oxide ($K_2O$) | 3.2 | 3.5 |
| Sodium Oxide ($Na_2O$) | 0.65 | 0.70 |
| Manganese Oxide (MnO) | 0.11 | 0.12 |
| Phosphate ($P_2O_5$) | <0.25 | <0.25 |

Comparative Example A. Reactive Media

As an example of a commercially available reactive media, Table 2 illustrates the average chemical composition of comparative media A, which was Filtralite® P, an expanded clay media produced by Saint-Gobain Weber.

TABLE 2

Average chemical composition of a comparative media A, in average wt %.

| $SiO_2$ | $Al_2O_3$ | $FeO_3$ | $K_2O$ | MgO | CaO | $Na_2O$ | $TiO_2$ | C tot |
| --- | --- | --- | --- | --- | --- | --- | --- | --- |
| 62% | 18% | 8% | 5% | 3% | 2% | 1% | 3% | 2% |

Comparative media A had an Si:Ca molar ratio of approximately 0.97:1, as shown in Table 3. Comparative media A had a maximum absorption capacity of 9.2 lbs (4.2 kg) of phosphorus per cubic yard (0.76 $m^3$) of comparative commercial media (0.006 g per $cm^3$), based on a 100% conversion of the calcium to a tri-calcium phosphate compound having a molar ratio of Ca:P of 1.5:1. Production of this media requires a vitrification temperature of at least about 2050° F. (1121° C.).

TABLE 3

Calculation of Si and Ca content of reactive media of comparative media A.

Comparative Prior Art Media Commercially Available

| Mass (lbs) | Component | % Purity | Cpd | Mass Si/Ca cpd (lbs) | MW Ca or Si | MW O | Total MW of Si/Ca cpd | Mass % of Si or Ca in cpd | Mass of Si or Ca in component | Moles of Si or Ca in Component |
| --- | --- | --- | --- | --- | --- | --- | --- | --- | --- | --- |
| 250 | Clay | 62.0% | SiO2 | 155 | 28 | 16 | 60 | 0.47 | 72.33 | 2.58 |
| 250 | Clay | 2.0% | CaO | 5 | 40 | 16 | 56 | 0.71 | 3.57 | 0.09 |
| 0 | Quick Lime | 0.0% | CaO | 0 | 40 | 16 | 56 | 0.71 | 0.00 | 0.00 |
| 0 | | 0.0% | SiO2 | 0 | 28 | 16 | 60 | 0.47 | 0.00 | 0.00 |
| 0 | Water | 100.0% | Water | 70 | | | | | | |
| 0 | Peat | 100.0% | Peat | 0 | 0 | 0 | 0 | | 3.57 | |

TABLE 3-continued

Calculation of Si and Ca content of reactive media of comparative media A.

Comparative Prior Art Media Commercially Available

| Mass (lbs) | Component | % Purity | Cpd | Mass Si/Ca cpd (lbs) | MW Ca or Si | MW O | Total MW of Si/Ca cpd | Mass % of Si or Ca in cpd | Mass of Si or Ca in component | Moles of Si or Ca in Component |
|---|---|---|---|---|---|---|---|---|---|---|
| 250 | Total mass | | | | | | | | | |
| 250 | Mass post-vitrification, with loss of water and 10% peat as ash. | | | | Wt % Si | 28.93% | | | Moles Si | 2.58 |
| | | | | | Wt % Ca | 1.43% | | | Moles Ca | 0.09 |
| | | | | | Wt ratio Ca:Si | 0.05 | | | Mole percent Si in Ca | 0.97 |

Comparative Example B. Reactive Media

As a further example of prior art reactive media, following the procedure of U.S. Pat. No. 9,254,582, approximately 250 pounds (113 kg) of raw, wet clay with a 35% moisture content, was obtained from a fractionating sand mine and was placed in a concrete mortar mixing device and mixing was commenced. To the mixing wet clay, 25 pounds (11.3 kg) of Canadian peat was added and allowed to mix to uniformity. Once uniformly mixed, 25 pounds (11.3 kg) of quicklime with a calcium content of approximately 94 wt % CaO was added slowly so as to develop a uniform distribution throughout the mixing clay material. The mixture was allowed to mix for 10 minutes following completion of the addition of the CaO. The addition of CaO caused an exothermic reaction as the CaO was hydrated by the water contained in the mixture. Upon completion of the mixing step, the material was removed from the mixing device and allowed to cool to ambient temperature for about 2-4 hours. Once cooled to ambient temperature, the cooled mixture was extruded through a 4" (10.2 cm) extruder to form discrete pellets of approximately ⅜" (0.95 cm) diameter by approximately ½" to ¾" (1.3 cm to 1.9 cm) in length. Once extruded, the pellets were heated to approximately 2050° F. (1121° C.) with a soak time of approximately 30 minutes. The final composition of the partially vitrified pellets is shown in Table 4. Comparative media B had an Si:Ca molar ratio of approximately 0.60:1, as shown in Table 5. Comparative media B had a maximum absorption capacity of 52 lbs (23 kg) of phosphorus per cubic yard (0.76 m$^3$) of comparative commercial media (0.030 g per cm$^3$), based on a 100% conversion of the calcium to a tri-calcium phosphate compound having a molar ratio of Ca:P of 1.5:1.

TABLE 4

Average chemical composition of comparative media B, in average wt %.

| Aluminum | 2.0000% |
|---|---|
| Arsenic | 0.0022% |
| Barium | 0.0003% |
| Calcium | 8.2000% |
| Iron | 2.4000% |
| Magnesium | 0.5200% |
| Nickel | 0.0007% |
| Potassium | 0.9300% |
| Silicon | 15.7000% |
| Sodium | 0.0320% |
| Titanium | 0.0031% |

TABLE 5

Si and Ca content of reactive media of comparative media B.

| | | | Prior Art Example | | | | | | Wt | Moles |
|---|---|---|---|---|---|---|---|---|---|---|
| Mass (lbs) | Component | % Purity | Cpd | Mass Si/Ca cpd (lbs) | MW Ca or Si | MW O | Total MW of Si/Ca cpd | % Mass % of Si or Ca in cpd | Mass of Si or Ca in component | Moles of Si or Ca in Component |
| 250 | Clay | 15.7% | SiO2 | 39.25 | 28 | 16 | 60 | 0.47 | 18.32 | 0.65 |
| 250 | Clay | 0.8% | CaO | 1.95 | 40 | 16 | 56 | 0.71 | 1.39 | 0.03 |
| 25 | Quick Lime | 94.0% | CaO | 23.5 | 40 | 16 | 56 | 0.71 | 16.79 | 0.42 |
| 25 | | 6.0% | SiO2 | 1.5 | 28 | 16 | 60 | 0.47 | 0.70 | 0.03 |
| 70 | Water | 100.0% | Water | 70 | | | | | | |
| 25 | Peat | 100.0% | Peat | 25 | 0 | 0 | 0 | | 18.18 | |
| 370 | Total mass | | | | | | | | | |
| 302.5 | Mass post-vitrification, with loss of water and 10% peat as ash. | | | | Wt % Si | 6.29% | | | Moles Si | 0.68 |
| | | | | | Wt % Ca | 6.01% | | | Moles Ca | 0.45 |
| | | | | | Wt ratio Ca:Si | 0.96 | | | Mole percent Si in Ca | 0.60 |

Example 1. Production of Reactive Media

A mortar-style mixer was used in this Example, although another suitable mixing device could be used such as a paddle or ribbon blender. In the mortar mixer, 250 lbs (113 kg) of red clay having the composition described in Table 1 and having about a 5 wt % moisture content, was mixed with 25 lbs (11.3 kg) of Canadian peat, (optionally, not performed in this Example, this can be substituted or supplemented by sawdust or other combustible organic material with an ash content of less than 10 wt %), 5 lbs (2.3 kg) of quicklime with a CaO content of 94 wt % or greater, 45 lbs (20.4 kg) of dolomite containing at least 10 wt % magnesium. These materials were mixed in their native state for approximately 5 minutes after which 70 lbs (31.8 kg) of water was slowly added to form a uniformly moist mixture. This moist mixture was mixed for an additional 5 minutes and then was removed from the mixer. Upon removal of the mixture, it was fed uniformly through an extrusion device to produce a pellet. The extrusion die was considered a shearing plate die so as to avoid unnecessary compression of the pellet which could reduce its ultimate porosity. Optionally, not performed in this Example, for enhanced pellet compression, extrusion can be performed under vacuum to remove entrained air. Following the extrusion process, the resulting pellets were placed in a kiln where they were heated to a final temperature of approximately 1950° F. The final pellets had a diameter of 0.25" to 0.38" (0.64 cm to 0.95 cm) and a length of 0.25" to 1" (0.64 cm to 2.54 cm). The reactive media had a Ca:Si molar ratio of 0.81:1, as shown in Table 6.

TABLE 7

| Ferrate starting material. | |
| --- | --- |
| Component | Amount |
| 50% (w/v) sodium hydroxide | 6000 mL |
| 12.5% (w/v) sodium hypochlorite | 3000 mL |
| 40 wt% $FeCl_3$ | 1000 mL |

An aqueous 50% (w/v) sodium hydroxide solution was placed into a jacketed mixing or reaction vessel. An aqueous 12.5% (w/v) sodium hypochlorite solution was added. The sodium hydroxide and sodium hypochlorite solutions were mixed as they reacted exothermically. During the reaction, the reaction vessel was cooled by means of circulating chilled water or other cooling liquid through the cooling jacket of the reaction vessel. After about 20 minutes, once the reaction mixture had cooled to approximately 95° F. (35° C.), an aqueous 40 wt % ferric chloride solution was added. The reaction mixture was stirred and another exothermic reaction occurred. The temperature was allowed to rise to a maximum of 120° F. (49° C.) and to mix for a period of 40 minutes. The ferrate concentration of the reaction mixture was measured via a spectrophotometer via the absorbance at 510 nm. The concentration of the ferrate was 20 g/L expressed as a concentration of ferrate ($FeO_4^{2-}$), corresponding to a percent yield from ferric chloride of 33%

Water at ambient temperature of approximately 82° F. (28° C.) and containing phosphorus was obtained from Lake

TABLE 6

Calculation of Si and Ca content of reactive media of Example 1

| Mass (lbs) | Component | % Purity | Cpd | Green Mixture When Quicklime/Dolomite is used | | | | | Wt | Moles |
| --- | --- | --- | --- | --- | --- | --- | --- | --- | --- | --- |
| | | | | Mass Si/Ca cpd (lbs) | MW Ca or Si | MW O | Total MW of Si/Ca cpd | % Mass % of Si or Ca in cpd | Mass of Si or Ca in component | Moles of Si or Ca in Component |
| 250 | Clay | 59.6% | SiO2 | 149 | 28 | 16 | 60 | 0.47 | 69.53 | 2.48 |
| 250 | Clay | 0.8% | CaO | 1.95 | 40 | 16 | 56 | 0.71 | 1.39 | 0.03 |
| 5 | quick lime | 94.0% | CaO | 4.7 | 40 | 16 | 56 | 0.71 | 3.36 | 0.08 |
| 5 | quick lime | 6.0% | SiO2 | 0.3 | 28 | 16 | 60 | 0.47 | 0.14 | 0.01 |
| 50 | Dolomite | 90.0% | CaCO3 | 45 | 40 | 16 | 100 | 0.40 | 18.00 | 0.45 |
| 50 | Dolomite | 10.0% | MgO | 0 | | | | | 0.00 | 0.00 |
| 50 | Dolomite | 6.0% | SiO2 | 0 | 28 | 16 | 60 | 0.47 | 0.01 | 0.00 |
| 25 | Peat | 100.0% | Peat | 0 | | | | | 0.00 | |
| 60 | Water | 100.0% | Water | 0 | | | | | 0.00 | |
| 390 | Total mass | | | | Wt % Si | 22.66% | | | Moles Si | 2.49 |
| 307.5 | Mass post-vitrification, with loss of water and 10% peat as ash. | | | | Wt % Ca | 7.40% | | | Moles Ca | 0.57 |
| | | | | | Ca:Si Ratio | 0.33 | | | Mole percent Si in Ca | 0.81 |

Example 2. Continuous Removal of Phosphorus from Water

Materials were added to a reaction vessel according to Table 7 (i.e., aqueous solutions) to produce a starting volume of Ferrate.

Apopka, in Florida, and was first filtered to remove particulates using a filter having a pore size of 100 microns. Following the initial filtration, 1 to 3 ppm (measured as $FeO_4^{2-}$ of the ferrate reaction mixture) was added to the filtered water and mixing occurred in the pipe or static mixer. The mixture was then allowed to react in a mixing tank for approximately 10 minutes to oxidize the phosphorus with the ferrate. The amount of added ferrate solution was determined experimentally using a 6 gang Phipps and Bird gang stirrer. Additions ranging from 0.25 ppm to 5 ppm were evaluated and the effective addition was found to be 1-3 ppm (e.g., concentration of ferrate with effective phosphorus removal wherein increased concentration of ferrate results in little to no increased phosphorus removal). Due to the basicity of the ferrate reaction mixture, the addition of the ferrate reaction mixture caused an increase in the pH of the water including the phosphorus to approximately 10.5.

An aqueous 50% (w/v) sodium hydroxide solution was added to the ferrate-treated water (oxidized water) to elevate the pH to approximately 10.8 prior to introduction into 4 parallel, 8" (20.3 cm) diameter reactive media columns with a bed depth of approximately 48" (121.9 cm). The amount of base was controlled continuously using a Hach SC200 Ph Controller with a set point of 10.8. The oxidized and pH-adjusted water was then fed to the columns of reactive media described above using a flow rate of approximately 10 GPM (37.9 LPM), which was about 7.2 gallons (27.3 L) per minute per square foot (0.093 $m^3$) of media cross-sectional area.

Following passage through the reactive media column, the treated water was again filtered using a filter having a pore size of 1 micron to capture any particulate phosphorus that escaped the media column. Following this final filtration, the water was neutralized to meet the necessary discharge requirements to a pH of less than 8.5 with citric acid. Total and dissolved reactive phosphorus concentrations were measured using a Hach Model DR 6000 spectrophotometer and utilizing the standard analytical method associated therewith which are EPA 365.1, 365.2, 365.3, and 356.4 compliant.

Phosphorus removal was measured by comparing both total and dissolved phosphorus concentrations of the incoming water with those of the treated water. The incoming water had approximately 100 parts per billion total phosphorus and about 20 parts per billion dissolved reactive phosphorus. The water following treatment measured in the undetectable range (less than 10 ppb) for both total and dissolved reactive phosphorus. The treated water had an iron concentration of 1.39 mg/L. The reactive media of the present Example had a maximum absorption capacity of 55 lbs (25 kg) of phosphorus per cubic yard (0.76 $m^3$) of comparative commercial media (0.033 g per $cm^3$), based on a 100% conversion of the calcium to a tri-calcium phosphate compound having a molar ratio of Ca:P of 1.5:1.

Example 3. Stability of Ferrate Formed Via Basic Ferrate Starting Material Mixture Ferrate produced by the method described in Example 2 has been found to be stable for a limited amount of time. Typically the ferrate solution degraded such that the $FeO_4^{2-}$ concentration was reduced by 50 wt % within about 4-6 hours necessitating a frequent make up cycle and a need for on-site synthesis equipment. A sample of the ferrate reaction mixture of Example 2 was removed and was monitored for ferrate concentration over time at room temperature, without shielding the solution from light, with the results given in Table 8. The concentration was determined by determining the absorbance at 510 nanometers and applying the Beer-Lambert equation for calculating concentration therefrom. The measurement was carried out using an Ocean Optics spectrophotometer.

TABLE 8

Strength of ferrate reaction mixture of Example 2 over time at room temperature.

| Time (h:m) | Ferrate concentration (g/L) | % Degradation |
|---|---|---|
| 0:00 | 18.9 | 0 |
| 1:00 | 18.5 | 2.1% |
| 2:10 | 16.6 | 14% |
| 6:06 | 9 | 52% |

Example 4. Small Scale Formation of Ferrate from Ferric Chloride and Potassium Permanganate A solution of 38-42% (w/v) $FeCl_3$ in water (2.5 g, 1.82 mL, 1 g $FeCl_3$, 6.17 mmol $FeCl_3$) and having a pH of about 2 (due to about 5 wt % of 37% w/w HCl in solution, or about 1.5 wt % HCl) was added to a 50 mL beaker, along with a stir bar, and was set on a stir plate which was then set to stir at 300 RPM, which was sufficient to mix to homogeneity. Potassium permanganate (99% purity, 0.5 g raw material, 0.495 g $KMnO_4$, 3.13 mmol $KMnO_4$) was added. The reaction mixture was allowed to react for 5 minutes while mixing. DI water (10 mL) was added at the end of the stirring, to prevent formation of a paste. The pH of the reaction mixture was 2.3.

Deionized (DI) water (50 g) was measured on a balance. About 0.06 g to 0.08 g of the reaction mixture was added to the DI water. Shortly afterwards, absorbance of a sample of the ferrate solution was measured on an Ocean Optics Spectrophotometer at 510 nm and at 525 nm. The absorbances were 0.58 at 510 nm and 0.74 at 525 nm, indicating a concentration of ferrate in the sample analyzed of about 52.6 g/L, representing an initial concentration of ferrate in the reaction mixture, of about 315.6 g/L, or about 2.64 M, and indicating a total yield of ferrate of 631.2 mg or 5.28 mmol, which was 84.85% yield from the ferric chloride.

Example 5. Large Scale Formation of Ferrate from Ferric Chloride and Potassium Permanganate A solution of 38-42% (w/v) $FeCl_3$ in water (50 g, 36.4 mL, 20 g $FeCl_3$, 123.3 mmol $FeCl_3$) and having a pH of about 2 (due to about 5 wt % of 37% w/w HCl in solution, or about 1.5 wt % HCl) was added to a 600 mL beaker, along with a stir bar, and was set on a stir plate which was then set to stir at 1000 RPM, which was sufficient to mix to homogeneity. Potassium permanganate (99% purity, 10 g raw material, 9.9 g $KMnO_4$, 62.6 mmol $KMnO_4$) was added. The reaction mixture was allowed to react for 5 minutes while mixing. The pH of the reaction mixture was 2.3. DI water (200 mL) was added at the end of the stirring, to prevent formation of a paste.

Deionized (DI) water (50 g) was measured on a balance. About 0.06 g to 0.08 g of the reaction mixture was added to the DI water. Shortly afterwards, absorbance of a sample of the ferrate solution was measured on an Ocean Optics Spectrophotometer at 510 nm and at 525 nm. The absorbances were 0.58 at 510 nm and 0.67 at 525 nm, indicating a concentration of ferrate in the sample analyzed of about 53.2 g/L, or about 0.44 M, and a total concentration of ferrate in the reaction mixture of about 319.4 g/L, or about 2.66 M, indicating a total yield of ferrate of, which was 84.45% yield from the ferric chloride.

Example 6. Stability of Ferrate Formed from Ferric Chloride and Potassium Permanganate Ferrate produced by the method described in Example 4 was monitored for ferrate concentration over time at room temperature, without shielding the solution from light, with the results given in Table 9. The concentration was determined by determining the absorbance at 510 nanometers and applying the Beer-Lambert equation for calculating concentration therefrom.

TABLE 9

Strength of ferrate reaction mixture of Example 4 over time at room temperature.

| Run | Time (days) | Ferrate concentration (g/L) | % Degradation |
|---|---|---|---|
| 1 | 0 | 209.40 | 0% |
|   | 5 | 186.13 | 11% |
|   | 6 | 183.88 | 12% |
|   | 7 | 176.38 | 16% |
| 2 | 0 | 256.0071 | 0% |
|   | 1 | 234.6731 | 8% |
|   | 2 | 185.8719 | 28% |
|   | 4 | 159.2299 | 38% |
|   | 13 | 98.08137 | 64% |

Example 7. Oxidation-Reduction Potential (ORP)

Ferrate exhibits low oxidation potential when in a basic environment, and high oxidation potential in acidic environments. A significant disadvantage of conventional ferrate mixtures is that they are only stable in basic solution, and in particular, ferrates formed according to Example 2 above has a solution pH of about 12.2 and when even small amounts are added to an aqueous solution, the aqueous solution pH is immediately raised to approximately 10.5, a pH where ferrate has a lower oxidation potential. By comparison, the process of producing ferrate from ferric chloride and potassium permanganate in an acidic medium described in Examples 4 and 5 herein generate a ferrate solution having a pH of approximately 3.5 to 4.0. When added in small amounts to an aqueous solution, the resulting pH of the aqueous solution remains below 7, or at least slightly acidic. To illustrate the importance of this relationship, acidic ferrate solutions prepared according to Examples 4 and 5 above were prepared, and about 0.072 grams of each ferrate solution were added to 50 grams of distilled water, to form two different diluted ferrate solutions. The starting pH and ORP were measured and recorded for each solution. A solution of 5% sodium hydroxide was then added dropwise to raise the pH. The adjusted solution was allowed to mix until the pH reading was stable. The ORP meter was placed in the solution and allowed to stabilize for 2 minutes and the reading was recorded. The ORP was measured using an Oakton Model 10 ORP Meter. Similarly, approximately 0.072 grams of basic ferrate solution, produced according to Example 2 above was placed in 50 grams of distilled water. The starting pH and ORP were measured and recorded. A solution of 5% sulfuric acid was then added dropwise to lower the pH. The adjusted solution was allowed to mix until the pH reading was stable. The ORP meter was placed in the solution and allowed to stabilize for 2 minutes and the reading recorded. The ORP was measured using an Oakton Model 10 ORP Meter. Table 10 shows the individual pH and corresponding ORP measurements of acidic and basic ferrate solutions during pH modification.

TABLE 10

Oxidation reduction potential and pH of acidic and basic ferrate solutions at various pH.

| Starting with acidic ferrate solution | | Starting with basic ferrate solution | |
|---|---|---|---|
| pH | ORP | pH | ORP |
| 3.38 | 927 | 12.49 | 338 |
| 3.86 | 892 | 12.3 | 394 |
| 4.1 | 878 | 12.06 | 421 |
| 5.5 | 741 | 11.28 | 491 |
| 6.26 | 730 | 10.51 | 534 |
|  |  | 9.72 | 617 |
|  |  | 9.13 | 653 |
|  |  | 8.52 | 702 |

Example 8. Continuous Removal of Phosphorus from Water Using Acidic Ferrate

Example 2 was repeated, but acidic ferrate formed via the method of Example 5 was used instead of the basic ferrate formed from sodium hydroxide, sodium hypochlorite, and ferric chloride. Instead of the effective concentration of 1-3 ppm ferrate used in Example 2, the effective concentration of the acidic ferrate was found to be 0.5-1 ppm. After oxidation of the phosphorus with the acidic ferrate, a greater amount of the aqueous 50% (w/v) sodium hydroxide solution needed to be added (as compared to Example 2) to basify the reaction mixture to pH 10.8 prior to flowing through the reactive media. An at least equivalent amount of phosphorus oxidation and removal was achieved using the acidic ferrate, as compared to Example 2; however, the final treated water from the acidic ferrate procedure had a lower final iron concentration of 0.24-0.46 mg/L.

Example 9. Continuous Removal of Phosphorus from Water Using Ferric Chloride as an Oxidizer Example 2 was repeated, but ferric chloride as an aqueous 40 wt % solution was used instead of the basic ferrate formed from sodium hydroxide, sodium hypochlorite, and ferric chloride. The effective concentration of the ferric chloride was found to be 1-3 ppm. Prior to the addition of ferric chloride, approximately 2 ppm of sodium hypochlorite was added to assist with the oxidation of the phosphorus (without sodium hypochlorite, 3-4 ppm ferric chloride was needed to achieve the same results). After oxidation of the phosphorus with the sodium hypochlorite and ferric chloride, an amount of the aqueous 50% (w/v) sodium hydroxide solution was added to basify the reaction mixture to pH 10.8 prior to flowing through the reactive media. An at least equivalent amount of phosphorus oxidation and removal was achieved using the sodium hypochlorite and ferric chloride, as compared to Example 2; however, the final treated water from the acidic ferrate procedure had a lower final iron concentration of 0.68 mg/L.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments

The following exemplary embodiments are provided, the numbering of which is not to be construed as designating levels of importance:

Embodiment 1 provides a method of removing phosphorus from water, the method comprising:

contacting an oxidizer and water comprising phosphorus to form water comprising oxidized phosphorus; and contacting the water comprising the oxidized phosphorus with a reactive media to capture the oxidized phosphorus on the reactive media, in the reactive media, or a combination thereof, as a solid salt comprising the oxidized phosphorus.

Embodiment 2 provides the method of Embodiment 1, wherein the phosphorus in the water comprising the phosphorus is in the form of elemental phosphorus, inorganic phosphorus, organic phosphorus, a dissolved form of phosphorus, a solid form of phosphorus, or a combination thereof.

Embodiment 3 provides the method of any one of Embodiments 1-2, wherein the phosphorus in the water is at a concentration of about 0.001 ppm to about 10,000 ppm.

Embodiment 4 provides the method of any one of Embodiments 1-3, wherein the phosphorus in the water is at a concentration of about 0.01 ppm to about 20 ppm.

Embodiment 5 provides the method of any one of Embodiments 1-4, wherein the oxidized phosphorus is phosphorus(V).

Embodiment 6 provides the method of any one of Embodiments 1-5, wherein the oxidized phosphorus is in the form of $PO_4^{3-}$.

Embodiment 7 provides the method of any one of Embodiments 1-6, wherein after contacting with the reactive media, the water has a phosphorus concentration of about 0 ppm to about 1 ppm.

Embodiment 8 provides the method of any one of Embodiments 1-7, wherein after contacting with the reactive media, the water has a phosphorus concentration of about 0.0001 ppm to 0.1 ppm.

Embodiment 9 provides the method of any one of Embodiments 1-8, wherein contacting the oxidizer and water comprising phosphorus comprises contacting an aqueous solution of the oxidizer and the water comprising phosphorus to form a reaction mixture.

Embodiment 10 provides the method of Embodiment 9, wherein the aqueous solution of the oxidizer comprises a solution comprising ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, ozone, or a combination thereof.

Embodiment 11 provides the method of any one of Embodiments 9-10, wherein the solution of the oxidizer comprises about 0.001 ppm to about 999,999 ppm of the oxidizer.

Embodiment 12 provides the method of any one of Embodiments 9-11, wherein the solution of the oxidizer comprises about 1,000 ppm to about 700,000 ppm of the oxidizer.

Embodiment 13 provides the method of any one of Embodiments 1-12, wherein the oxidizer comprises ozone; ferric chloride ($FeCl_3$); a salt comprising peroxide, permanganate, hypochlorite, chlorate, perchlorate, persulfate, dichromate, or ferrate; or a combination thereof.

Embodiment 14 provides the method of any one of Embodiments 1-13, wherein the oxidizer comprises ferrate.

Embodiment 15 provides the method of Embodiment 14, wherein the ferrate is iron(VI).

Embodiment 16 provides the method of any one of Embodiments 14-15, wherein the ferrate is in the form of $FeO_4^{2-}$.

Embodiment 17 provides the method of any one of Embodiments 14-16, wherein the ferrate and the phosphorus in the water react to form $PO_4^{3-}$.

Embodiment 18 provides the method of any one of Embodiments 14-17, wherein the contacting ferrate and water comprising phosphorus comprises contacting a solution of the ferrate and the water comprising phosphorus to form a reaction mixture.

Embodiment 19 provides the method of Embodiment 18, wherein the solution of the ferrate is an aqueous solution.

Embodiment 20 provides the method of any one of Embodiments 18-19, wherein the ferrate is about 0.001 ppm to about 999,999 ppm of the solution of the ferrate.

Embodiment 21 provides the method of any one of Embodiments 18-20, wherein the ferrate is about 1,000 ppm to about 500,000 ppm of the solution of the ferrate.

Embodiment 22 provides the method of any one of Embodiments 18-21, wherein the ferrate is about 0.001 ppm to about 1,000 ppm of the reaction mixture.

Embodiment 23 provides the method of any one of Embodiments 18-22, wherein the ferrate is about 0.1 ppm to about 10 ppm of the reaction mixture.

Embodiment 24 provides the method of any one of Embodiments 1-23, wherein the contacting of the oxidizer and the water comprising phosphorus comprises contacting under shear.

Embodiment 25 provides the method of any one of Embodiments 1-24, wherein the contacting of the oxidizer and the water comprising phosphorus comprises contacting for about 1 s to about 24 h.

Embodiment 26 provides the method of any one of Embodiments 1-25, wherein the contacting of the oxidizer and the water is performed at a temperature of greater than 0° C. to less than or equal to about 200° C.

Embodiment 27 provides the method of any one of Embodiments 1-26, wherein the contacting of the oxidizer and the water is performed at a temperature of about 15° C. to about 30° C.

Embodiment 28 provides the method of any one of Embodiments 1-27, wherein the oxidizer is ferric chloride ($FeCl_3$).

Embodiment 29 provides the method of any one of Embodiments 1-28, further comprising generating the oxidizer.

Embodiment 30 provides the method of any one of Embodiments 18-29, further comprising generating the ferrate.

Embodiment 31 provides the method of Embodiment 30, wherein generating the ferrate comprises thermally generating the ferrate, electrolytically generating the ferrate, chemically generating the ferrate, or a combination thereof.

Embodiment 32 provides the method of any one of Embodiments 30-31, wherein generating the ferrate comprising forming a ferrate starting material mixture comprising an oxidizer and an iron source, under conditions sufficient to form the ferrate.

Embodiment 33 provides the method of Embodiment 32, comprising heating the ferrate starting material mixture, or allowing the ferrate starting material mixture to heat, to form the ferrate.

Embodiment 34 provides the method of any one of Embodiments 32-33, wherein the ferrate starting material mixture has a temperature of about 10° C. to about 500° C.

Embodiment 35 provides the method of any one of Embodiments 32-34, wherein the oxidizer comprises ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, ozone, or a combination thereof.

Embodiment 36 provides the method of any one of Embodiments 32-35, wherein the oxidizer is sodium hypochlorite.

Embodiment 37 provides the method of any one of Embodiments 32-36, wherein the iron source comprises ferric chloride ($FeCl_3$), ferric bromide, ferrous chloride, ferrous bromide, ferric nitrate, ferrous nitrate, ferric sulfate, ferrous sulfate, ferric phosphate, ferrous phosphate, ferric oxides, ferrous oxides, ferric carbonate, ferrous carbonate, or a combination thereof.

Embodiment 38 provides the method of any one of Embodiments 32-37, wherein the iron source is ferric chloride ($FeCl_3$).

Embodiment 39 provides the method of any one of Embodiments 32-38, wherein the ferrate starting material mixture has a mole ratio of the oxidizer to the iron source of about 1:100 to about 100:1.

Embodiment 40 provides the method of any one of Embodiments 32-39, wherein the ferrate starting material mixture has a mole ratio of the oxidizer to the iron source of about 1:5 to about 5:1.

Embodiment 41 provides the method of any one of Embodiments 32-40, wherein the ferrate starting material mixture is a basic ferrate starting material mixture comprising a base, the oxidizer, and the iron source.

Embodiment 42 provides the method of Embodiment 41, wherein the ferrate starting material mixture has a temperature of about 30° C. to about 60° C.

Embodiment 43 provides the method of any one of Embodiments 41-42, wherein the base comprises sodium hydroxide, calcium hydroxide, sodium carbonate, sodium bicarbonate, potassium hydroxide, potassium bicarbonate, potassium carbonate, sodium phosphate, disodium hydrogen phosphate, sodium aluminate, sodium borate, sodium acetate, sodium silicate, or a combination thereof.

Embodiment 44 provides the method of any one of Embodiments 41-43, wherein the base is sodium hydroxide (NaOH).

Embodiment 45 provides the method of any one of Embodiments 41-44, wherein the base is about 20 wt % to about 95 wt % of the total amount of the base, the oxidizer, and the iron source.

Embodiment 46 provides the method of any one of Embodiments 41-45, wherein the base is about 70 wt % to about 90 wt % of the total amount of the base, the oxidizer, and the iron source.

Embodiment 47 provides the method of any one of Embodiments 41-46, wherein the oxidizer or a salt thereof is about 1 wt % to about 50 wt % of the total amount of the base, the oxidizer, and the iron source.

Embodiment 48 provides the method of any one of Embodiments 41-47, wherein the oxidizer or a salt thereof is about 3 wt % to about 20 wt % of the total amount of the base, the oxidizer, and the iron source.

Embodiment 49 provides the method of any one of Embodiments 41-48, wherein the oxidizer is sodium hypochlorite.

Embodiment 50 provides the method of any one of Embodiments 41-49, wherein the iron source is about 1 wt % to about 50 wt % of the mixture of the base, oxidizer, and iron source.

Embodiment 51 provides the method of any one of Embodiments 41-50, wherein the iron source is about 3 wt % to about 20 wt % of the mixture of the base, oxidizer, and iron source.

Embodiment 52 provides the method of any one of Embodiments 41-51, wherein the iron source is ferric chloride.

Embodiment 53 provides the method of any one of Embodiments 41-52, wherein the basic ferrate starting material mixture has a molar ratio of the oxidizer to the iron source of about 1:1 to about 3:1.

Embodiment 54 provides the method of any one of Embodiments 41-53, wherein the ferrate formed by the method of making the ferrate from the basic ferrate starting material mixture is in a solution having a pH of about 9 to about 14.

Embodiment 55 provides the method of any one of Embodiments 41-54, wherein the ferrate formed by the method of making the ferrate from the basic ferrate starting material mixture is in a solution having a pH of about 9 to about 12.

Embodiment 56 provides the method of any one of Embodiments 32-55, wherein generating the ferrate comprises forming an acidic ferrate starting material mixture comprising an acid, the oxidizer, and the iron source, under conditions sufficient to form the ferrate.

Embodiment 57 provides the method of Embodiment 56, wherein the acidic ferrate starting material mixture has a temperature of about 10° C. to about 30° C.

Embodiment 58 provides the method of any one of Embodiments 56-57, wherein the acid comprises a mineral acid, an organic acid, or a combination thereof.

Embodiment 59 provides the method of any one of Embodiments 56-58, wherein the acid comprises phosphoric acid, sulfuric acid, hydrochloric acid, acetic acid, or a combination thereof.

Embodiment 60 provides the method of any one of Embodiments 56-59, wherein the acid is hydrochloric acid.

Embodiment 61 provides the method of any one of Embodiments 56-60, wherein the oxidizer is about 10 wt % to about 60 wt % of the total amount of the oxidizer and the iron source.

Embodiment 62 provides the method of any one of Embodiments 56-61, wherein the oxidizer is about 25 wt % to about 40 wt % of the total amount of the oxidizer and the iron source.

Embodiment 63 provides the method of any one of Embodiments 56-62, wherein the oxidizer comprises potassium permanganate.

Embodiment 64 provides the method of any one of Embodiments 56-63, wherein the iron source is about 40 wt % to about 90 wt % of the total amount of the oxidizer and the iron source.

Embodiment 65 provides the method of any one of Embodiments 56-64, wherein the iron source is about 60 wt % to about 70 wt % of the total amount of the oxidizer and the iron source.

Embodiment 66 provides the method of any one of Embodiments 56-65, wherein the iron source comprises ferric chloride.

Embodiment 67 provides the method of any one of Embodiments 56-66, wherein the acidic ferrate starting material mixture has a molar ratio of the oxidizer to the iron source of about 1:1 to about 1:3.

Embodiment 68 provides the method of any one of Embodiments 56-67, wherein the ferrate formed by the method of making the ferrate from the acidic ferrate starting material mixture is in a solution having a pH of about 1 to about 5.

Embodiment 69 provides the method of any one of Embodiments 56-68, wherein the ferrate formed by the method of making the ferrate from the acidic ferrate starting material mixture is in a solution having a pH of about 2 to about 3.

Embodiment 70 provides the method of any one of Embodiments 1-69, wherein contacting the water comprising the oxidized phosphorus with the reactive media comprises contacting in a column, tank, filter, or a combination thereof.

Embodiment 71 provides the method of any one of Embodiments 1-70, wherein contacting the water comprising the oxidized phosphorus with the reactive media comprises contacting flowing the water through a column comprising the reactive media.

Embodiment 72 provides the method of any one of Embodiments 1-71, wherein the reactive media comprises iron, lanthanum, calcium, or a combination thereof.

Embodiment 73 provides the method of any one of Embodiments 1-72, wherein the reactive media comprises calcium.

Embodiment 74 provides the method of Embodiment 73, wherein the calcium is about 0.01 wt % to about 100 wt % of the reactive media.

Embodiment 75 provides the method of any one of Embodiments 73-74, wherein the calcium is about 10 wt % to about 20 wt % of the reactive media.

Embodiment 76 provides the method of any one of Embodiments 1-75, wherein the reactive media comprises calcium oxide (CaO), calcium hydroxide (Ca(OH)$_2$), or a combination thereof.

Embodiment 77 provides the method of any one of Embodiments 1-76, wherein the reactive media comprises calcium oxide (CaO).

Embodiment 78 provides the method of any one of Embodiments 73-77, wherein at least some of the calcium in the reactive media is reactive calcium that is available to react with the oxidized phosphorus to form the solid calcium salt.

Embodiment 79 provides the method of Embodiment 78, wherein the reactive calcium in the reactive media that is available to react with the oxidized phosphorus to form the solid calcium salt is comprised in a calcium material that comprises a calcium salt, an inorganic calcium compound, or a combination thereof.

Embodiment 80 provides the method of any one of Embodiments 78-79, wherein the reactive calcium as CaO is about 0.01 wt % to about 100 wt % of the reactive media, wherein the reactive calcium is in the form of any water-soluble salt or inorganic compound including the reactive calcium.

Embodiment 81 provides the method of any one of Embodiments 78-80, wherein the reactive calcium as CaO is about 14 wt % to about 18 wt % of the reactive media, wherein the reactive calcium is in the form of any water-soluble salt or inorganic compound including the reactive calcium.

Embodiment 82 provides the method of any one of Embodiments 1-81, wherein the reactive media comprises a ceramic.

Embodiment 83 provides the method of Embodiment 82, wherein the ceramic is about 50 wt % to about 100 wt % of the reactive media.

Embodiment 84 provides the method of any one of Embodiments 82-83, wherein the ceramic is about 80 wt % to about 99 wt % of the reactive media.

Embodiment 85 provides the method of any one of Embodiments 82-84, wherein at least some of the formed solid salt occupies intersticies in the ceramic.

Embodiment 86 provides the method of any one of Embodiments 82-85, wherein the ceramic comprises a calcium silicate, an iron silicate, an aluminum silicate, an other silicate, or a combination thereof.

Embodiment 87 provides the method of any one of Embodiments 1-86, wherein the solid calcium salt is a salt of calcium and phosphate.

Embodiment 88 provides the method of any one of Embodiments 1-87, wherein the solid calcium salt comprises monocalcium phosphate (Ca(H$_2$PO$_4$)$_2$), dicalcium phosphate (CaHPO$_4$), tricalcium phosphate (Ca$_3$(PO$_4$)$_2$), amorphous calcium phosphate, dicalcium diphosphate (Ca$_2$P$_2$O$_7$), calcium triphosphate (Ca$_5$(P$_3$O$_{10}$)$_2$), hydroxyapatite (Ca$_5$(PO$_4$)$_3$(OH)), apatite (Ca$_{10}$(PO$_4$)$_6$(OH, F, Cl, Br)$_2$), tetracalcium phosphate (Ca$_4$(PO$_4$)$_{20}$), a hydrate thereof, or a combination thereof.

Embodiment 89 provides the method of any one of Embodiments 1-88, wherein the solid calcium salt comprises tricalcium phosphate (Ca$_3$(PO$_4$)$_2$).

Embodiment 90 provides the method of any one of Embodiments 1-89, wherein about 0 wt % to about 100 wt % of the solid calcium salt is tricalcium phosphate.

Embodiment 91 provides the method of any one of Embodiments 1-90, wherein about 50 wt % to about 100 wt % of the solid calcium salt is tricalcium phosphate.

Embodiment 92 provides the method of any one of Embodiments 1-91, wherein less than about 50 wt % of the solid calcium salt is hydroxyapatite.

Embodiment 93 provides the method of any one of Embodiments 1-92, wherein about 0 wt % to about 20 wt % of the solid calcium salt is hydroxyapatite.

Embodiment 94 provides the method of any one of Embodiments 1-93, wherein about 0.01 wt % to about 30 wt % of the reactive media is magnesium.

Embodiment 95 provides the method of any one of Embodiments 1-94, wherein about 1 wt % to about 2 wt % of the reactive media is magnesium.

Embodiment 96 provides the method of any one of Embodiments 1-95, wherein the reactive media is formed from a reactive media starting material.

Embodiment 97 provides the method of Embodiment 96, wherein the reactive media starting material comprises clay.

Embodiment 98 provides the method of Embodiment 97, wherein the clay is about 50 wt % to about 90 wt % of the reactive media starting material.

Embodiment 99 provides the method of any one of Embodiments 97-98, wherein the clay is about 50 wt % to about 80 wt % of the reactive media starting material.

Embodiment 100 provides the method of any one of Embodiments 97-99, wherein the clay is a non-clumping clay.

Embodiment 101 provides the method of any one of Embodiments 97-100, wherein the clay is a non-bentonite clay.

Embodiment 102 provides the method of any one of Embodiments 97-101, wherein the clay is a non-clumping clay.

Embodiment 103 provides the method of any one of Embodiments 97-102, wherein the clay comprises calcium silicates, iron silicates, aluminum silicates, or a combination thereof.

Embodiment 104 provides the method of any one of Embodiments 97-103, wherein the clay is kaolinite, illite, gibbsite, silt, silica, or a combination thereof.

Embodiment 105 provides the method of any one of Embodiments 96-104, wherein the reactive media starting material comprises a calcium source.

Embodiment 106 provides the method of Embodiment 105, wherein the calcium source is about 0.01 wt % to about 99 wt % of the reactive media starting material.

Embodiment 107 provides the method of any one of Embodiments 105-106, wherein the calcium source is about 5 wt % to about 20 wt % of the reactive media starting material.

Embodiment 108 provides the method of any one of Embodiments 105-107, wherein the calcium source is a calcium silicate, CaO, Ca(OH)$_2$, CaCO$_3$, limestone, dolomitic limestone, or a combination thereof.

Embodiment 109 provides the method of any one of Embodiments 105-108, wherein the calcium source is CaCO$_3$ and CaO.

Embodiment 110 provides the method of any one of Embodiments 105-109, wherein the calcium source is limestone and CaO.

Embodiment 111 provides the method of any one of Embodiments 105-110, wherein the calcium source is dolomitic limestone and CaO.

Embodiment 112 provides the method of any one of Embodiments 96-111, wherein about 0 wt % to about 100 wt % of the reactive media starting material is CaO.

Embodiment 113 provides the method of any one of Embodiments 96-112, wherein about 0.01 wt % to about 5 wt % of the reactive media starting material is CaO.

Embodiment 114 provides the method of any one of Embodiments 96-113, wherein about 0.01 wt % to about 100 wt % of the reactive media starting material is CaCO$_3$.

Embodiment 115 provides the method of any one of Embodiments 96-114, wherein the about 0.1 wt % to about 10 wt % of the reactive media starting material is CaCO$_3$.

Embodiment 116 provides the method of any one of Embodiments 96-115, wherein about 0.01 wt % to about 100 wt % of the reactive media starting material is dolomite.

Embodiment 117 provides the method of any one of Embodiments 96-116, wherein about 1 wt % to about 30 wt % of the reactive media starting material is dolomite.

Embodiment 118 provides the method of any one of Embodiments 96-117, wherein about 0.01 wt % to about 99 wt % of the reactive media starting material is dolomitic limestone.

Embodiment 119 provides the method of any one of Embodiments 96-118, wherein about 5 wt % to about 20 wt % of the reactive media starting material is dolomitic limestone.

Embodiment 120 provides the method of any one of Embodiments 96-119, wherein about 0.01 wt % to about 100 wt % of the reactive media starting material is reactive calcium as CaO, wherein the reactive calcium in the reactive media starting material is in the form of any water-soluble salt or inorganic compound including the reactive calcium.

Embodiment 121 provides the method of any one of Embodiments 96-120, wherein about 15 wt % to about 25 wt % of the reactive media starting material is reactive calcium as CaO, wherein the reactive calcium in the reactive media starting material is in the form of any water-soluble salt or inorganic compound including the reactive calcium.

Embodiment 122 provides the method of any one of Embodiments 96-121, wherein about 1 wt % to about 40 wt % of the reactive media starting material is calcium.

Embodiment 123 provides the method of any one of Embodiments 96-122, wherein the about 1 wt % to about 20 wt % of the reactive media starting material is calcium.

Embodiment 124 provides the method of any one of Embodiments 96-123, wherein the reactive media starting material comprises a magnesium source.

Embodiment 125 provides the method of Embodiment 124, wherein the magnesium source is about 0.01 wt % to about 99 wt % of the reactive media starting material.

Embodiment 126 provides the method of any one of Embodiments 124-125, wherein the magnesium source is about 5 wt % to about 20 wt % of the reactive media starting material.

Embodiment 127 provides the method of any one of Embodiments 124-126, wherein the magnesium source is dolomitic limestone, dolomite (CaMg(CO$_3$)$_2$), magnesium oxide, magnesium carbonate, fly ash, cement kiln dust, an industrial byproduct including Mg, or a combination thereof.

Embodiment 128 provides the method of any one of Embodiments 124-127, wherein the magnesium source is dolomitic limestone.

Embodiment 129 provides the method of any one of Embodiments 124-128, wherein the magnesium source is the same as a calcium source.

Embodiment 130 provides the method of any one of Embodiments 96-129, wherein the reactive media starting material comprises an organic material.

Embodiment 131 provides the method of Embodiment 130, wherein the organic material is about 0.01 wt % to about 50 wt % of the reactive media starting material.

Embodiment 132 provides the method of any one of Embodiments 130-131, wherein the organic material is about 1 wt % to about 20 wt % of the reactive media starting material.

Embodiment 133 provides the method of any one of Embodiments 130-132, wherein the organic material is saw dust, wood residue, cellulose fiber, lake bottom sludge, peat, organic agricultural or industrial residue, or a combination thereof.

Embodiment 134 provides the method of any one of Embodiments 130-133, wherein the organic material is peat.

Embodiment 135 provides the method of any one of Embodiments 96-134, wherein the reactive media starting material comprises a clay source, a calcium source, a magnesium source, and an organic material.

Embodiment 136 provides the method of Embodiment 135, wherein the calcium source and the magnesium source are the same.

Embodiment 137 provides the method of any one of Embodiments 96-136, wherein the reactive media starting material comprises a non-clumping clay, CaO, dolomitic limestone, peat, and water.

Embodiment 138 provides the method of any one of Embodiments 96-137, wherein forming the reactive media comprises drying a wet reactive media starting material to form the reactive media starting material.

Embodiment 139 provides the method of Embodiment 138, wherein drying the reactive media starting material comprises heating to a temperature of about 30° C. to about 3,000° C.

Embodiment 140 provides the method of any one of Embodiments 138-139, wherein drying the reactive media starting material comprises heating to a temperature of about 30° C. to about 300° C.

Embodiment 141 provides the method of any one of Embodiments 138-140, wherein drying the reactive media starting material comprises drying to a moisture content of about 0 wt % to about 50 wt %.

Embodiment 142 provides the method of any one of Embodiments 138-141, wherein drying the reactive media starting material comprises drying to a moisture content of about 10 wt % to about 30 wt %.

Embodiment 143 provides the method of any one of Embodiments 96-142, wherein forming the reactive media comprises vitrifying the reactive media starting material.

Embodiment 144 provides the method of Embodiment 143, wherein vitrifying the reactive media starting material comprises heating to a temperature of about 500° C. to about 3000° C.

Embodiment 145 provides the method of any one of Embodiments 143-144, wherein vitrifying the reactive media starting material comprises heating to a temperature of about 900° C. to about 1100° C.

Embodiment 146 provides the method of any one of Embodiments 96-145, wherein forming the reactive media comprises forming a calcium silicate from calcium and silicon in the reactive media starting material.

Embodiment 147 provides the method of Embodiment 146, wherein the calcium silicate is $CaSiO_3$, $Ca_2SiO_4$, $Ca_3SiO_5$, $Ca_3Si_2O_7$, or a combination thereof.

Embodiment 148 provides the method of any one of Embodiments 96-147, wherein forming the reactive media comprises forming CaO from $Ca(OH)_2$ in the reactive media starting material.

Embodiment 149 provides the method of any one of Embodiments 96-148, wherein forming the reactive media comprises extruding the reactive media starting material or extruding reactive media formed therefrom.

Embodiment 150 provides the method of any one of Embodiments 96-149, wherein the temperature used during formation of the reactive media from the reactive media starting material does not exceed about 1,100° C.

Embodiment 151 provides the method of any one of Embodiments 96-150, wherein the temperature used during formation of the reactive media from the reactive media starting material does not exceed about 1,070° C.

Embodiment 152 provides the method of any one of Embodiments 96-151, wherein the mole % Si in Ca is controlled during formation of the reactive media to be about 1% to about 99%

Embodiment 153 provides the method of any one of Embodiments 96-152, wherein the mole % Si in Ca is controlled during formation of the reactive media to be about 70% to about 90%.

Embodiment 154 provides the method of any one of Embodiments 1-153, further comprising forming the reactive media.

Embodiment 155 provides the method of any one of Embodiments 1-154, wherein the reactive media has a capacity for phosphorus of 0.01 g to about 0.5 g of phosphorus per g of reactive media.

Embodiment 156 provides the method of any one of Embodiments 1-155, wherein the reactive media has a capacity for phosphorus of 0.01 g to about 0.2 g of phosphorus per g of reactive media.

Embodiment 157 provides the method of any one of Embodiments 1-156, wherein during contacting with the reactive media the pH of the water comprising the oxidized phosphorus is about 9 to about 14.

Embodiment 158 provides the method of any one of Embodiments 1-157, wherein during contacting with the reactive media the pH of the water comprising the oxidized phosphorus is about 10 to about 12.

Embodiment 159 provides the method of any one of Embodiments 1-158, comprising controlling the pH of the water comprising the oxidized phosphorus prior to or during contacting the water comprising the oxidized phosphorus with the reactive media.

Embodiment 160 provides the method of Embodiment 159, wherein controlling the pH of the water comprising the oxidized phosphorus comprises combining with a base.

Embodiment 161 provides the method of any one of Embodiments 159-160, wherein controlling the pH of the water comprising the oxidized phosphorus comprises combining with sodium hydroxide, calcium hydroxide, sodium carbonate, sodium bicarbonate, potassium hydroxide, potassium bicarbonate, potassium carbonate, sodium phosphate, disodium hydrogen phosphate, sodium aluminate, sodium borate, sodium acetate, sodium silicate, or a combination thereof.

Embodiment 162 provides the method of any one of Embodiments 159-161, wherein controlling the pH of the water comprising the oxidized phosphorus comprises combining with sodium hydroxide (NaOH).

Embodiment 163 provides the method of any one of Embodiments 1-162, further comprising filtering the water comprising the phosphorus prior to contacting the water comprising the phosphorus with the oxidizer.

Embodiment 164 provides the method of Embodiment 163, comprising filtering the water comprising the phosphorus prior to contacting the water comprising the phosphorus with the oxidizer through a filter with a pore size of about 1 micron to about 1,000 microns.

Embodiment 165 provides the method of any one of Embodiments 163-164, comprising filtering the water comprising the phosphorus prior to contacting the water comprising the phosphorus with the oxidizer through a filter with a pore size of about 5 microns to about 200 microns.

Embodiment 166 provides the method of any one of Embodiments 163-165, wherein the filtering of the water comprising the phosphorus prior to contacting the water comprising the phosphorus with the oxidizer removes or reduces the concentration of organic particles, inorganic particles, or a combination thereof.

Embodiment 167 provides the method of any one of Embodiments 1-166, further comprising filtering the water after capturing the oxidized phosphorus on or in the reactive media.

Embodiment 168 provides the method of Embodiment 167, comprising filtering the water after capturing of the oxidized phosphorus on or in the reactive media through a filter with a pore size of about 0.1 microns to about 1,000 microns.

Embodiment 169 provides the method of any one of Embodiments 167-168, comprising filtering the water after capturing of the oxidized phosphorus on or in the reactive media through a filter with a pore size of about 0.1 micron to about 10 microns.

Embodiment 170 provides the method of any one of Embodiments 167-169, wherein filtering the water after capturing of the oxidized phosphorus on or in the reactive media removes or reduces the concentration of phosphate-containing particles.

Embodiment 171 provides the method of any one of Embodiments 1-170, further comprising reducing the pH of the water after capturing the oxidized phosphorus on or in the reactive media.

Embodiment 172 provides the method of Embodiment 171, wherein reducing the pH of the water comprises reducing the pH to about 6 to about 11.

Embodiment 173 provides the method of any one of Embodiments 171-172, wherein reducing the pH of the water comprises reducing the pH to about 8-9.

Embodiment 174 provides the method of any one of Embodiments 171-173, wherein reducing the pH of the water comprises contacting the water with an acid.

Embodiment 175 provides the method of any one of Embodiments 171-174, wherein reducing the pH of the water comprises contacting the water with a mineral acid, an organic acid, or a combination thereof.

Embodiment 176 provides the method of any one of Embodiments 171-175, wherein reducing the pH of the water comprises contacting the water with citric acid, hydrochloric acid, acetic acid, sulfuric acid, or a combination thereof.

Embodiment 177 provides a method of removing oxidized phosphorus from water, the method comprising:

contacting water comprising ferrate-oxidized phosphorus with a calcium-containing reactive media to capture the oxidized phosphorus on the reactive media, in the reactive media, or a combination thereof, as a salt of calcium and phosphate.

Embodiment 178 provides a method of removing phosphorus from water, the method comprising:

contacting ferrate and water comprising phosphorus to form water comprising phosphate; and contacting the water comprising the phosphate at a pH of about 10 to about 12 with a calcium-containing reactive media to capture the oxidized phosphorus on the reactive media, in the reactive media, or a combination thereof, as a salt of calcium and phosphate.

Embodiment 179 provides an apparatus for removing phosphorus from water, the apparatus comprising:

a reactor for contacting an oxidizer and water comprising phosphorus to form water comprising oxidized phosphorus; and a contactor for contacting the water comprising the oxidized phosphorus with a reactive media to capture the oxidized phosphorus on the reactive media, in the reactive media, or a combination thereof, as a solid salt comprising the oxidized phosphorus.

Embodiment 180 provides the method or apparatus of any one or any combination of Embodiments 1-179 optionally configured such that all elements or options recited are available to use or select from.

What is claimed is:

1. A method of removing phosphorus from water, the method comprising:

contacting an oxidizer comprising ferrate and water comprising phosphorus to form water comprising oxidized phosphorus; and contacting the water comprising the oxidized phosphorus with a reactive media comprising a reactive element to capture the oxidized phosphorus on and/or in the reactive media as a solid salt comprising the oxidized phosphorus and the reactive element.

2. The method of claim 1, wherein contacting the oxidizer and water comprising phosphorus comprises contacting an aqueous solution of the oxidizer and the water comprising phosphorus to form a reaction mixture.

3. The method of claim 1, wherein the oxidizer further comprises at least one material chosen from ozone, ferric chloride ($FeCl_3$), potassium permanganate, potassium dichromate, potassium chlorate, potassium persulfate, sodium persulfate, perchloric acid, peracetic acid; potassium monopersulfate, hydrogen peroxide, sodium hypochlorite, and potassium hypochlorite.

4. The method of claim 1, further comprising generating the ferrate comprising forming a ferrate starting material mixture comprising an oxidizer and an iron source, under conditions sufficient to form the ferrate.

5. The method of claim 4, wherein the ferrate starting material mixture is a basic ferrate starting material mixture comprising a base, the oxidizer, and the iron source.

6. The method of claim 5, wherein the ferrate formed from the basic ferrate starting material mixture is in a solution having a pH of about 9 to about 14.

7. The method of claim 4, wherein the ferrate starting material mixture is an acidic ferrate starting material mixture comprising an acid, the oxidizer, and the iron source.

8. The method of claim 7, wherein the ferrate formed from the acidic ferrate starting material mixture is in a solution having a pH of about 1 to about 5.

9. The method of claim 1, wherein the reactive media comprises calcium.

10. The method of claim 1, wherein the reactive media comprises calcium oxide (CaO).

11. The method of claim 9, wherein at least some of the calcium in the reactive media is reactive calcium that is available to react with the oxidized phosphorus to form the solid calcium salt.

12. The method of claim 1, wherein the reactive media comprises a ceramic.

13. The method of claim 1, wherein the solid calcium salt is a salt of calcium and phosphate.

14. The method of claim 1, wherein about 0.01 wt % to about 30 wt % of the reactive media is magnesium.

15. The method of claim 1, further comprising forming the reactive media comprising vitrifying and/or drying a reactive media starting material.

16. The method of claim 1, wherein during contacting with the reactive media the pH of the water comprising the oxidized phosphorus is about 9 to about 14.

17. A method of removing phosphorus from water, the method comprising:

contacting ferrate and water comprising phosphorus to form water comprising phosphate; and contacting the water comprising the phosphate at a pH of about 10 to about 12 with a calcium-containing reactive media to capture the oxidized phosphorus on and/or in the reactive media as a salt of calcium from the reactive media and phosphate.

* * * * *

UNITED STATES PATENT AND TRADEMARK OFFICE
CERTIFICATE OF CORRECTION

PATENT NO. : 11,267,733 B2
APPLICATION NO. : 16/650945
DATED : March 8, 2022
INVENTOR(S) : Luke et al.

Page 1 of 1

It is certified that error appears in the above-identified patent and that said Letters Patent is hereby corrected as shown below:

In the Claims

In Column 46, Line 12, in Claim 3, delete "acid;" and insert --acid,-- therefor

Signed and Sealed this
Twenty-sixth Day of July, 2022

Katherine Kelly Vidal
*Director of the United States Patent and Trademark Office*